United States Patent
Yu et al.

(10) Patent No.: US 7,542,600 B2
(45) Date of Patent: *Jun. 2, 2009

(54) VIDEO IMAGE QUALITY

(75) Inventors: Keman Yu, Beijing (CN); Jiang Li, Beijing (CN); Shipeng Li, Redmond, WA (US)

(73) Assignee: Microsoft Corporation, Remond, WA (US)

(*) Notice: Subject to any disclaimer, the term of this patent is extended or adjusted under 35 U.S.C. 154(b) by 894 days.

This patent is subject to a terminal disclaimer.

(21) Appl. No.: 10/970,263

(22) Filed: Oct. 21, 2004

(65) Prior Publication Data

US 2006/0088209 A1    Apr. 27, 2006

(51) Int. Cl.
*G06K 9/00* (2006.01)
(52) U.S. Cl. .................. 382/167; 382/166; 382/164; 382/274
(58) Field of Classification Search .......... 382/167, 382/164, 166, 282, 274, 103, 107, 118, 199, 382/159, 173; 348/222.1, 207.99, 231.99, 348/317, 14.15, 169, 597; 358/1.9, 537, 358/515, 520; 707/6
See application file for complete search history.

(56) References Cited

U.S. PATENT DOCUMENTS

| | | | |
|---|---|---|---|
| 3,988,602 A | 10/1976 | Gorsica, Jr. | |
| 5,267,331 A | 11/1993 | Siwoff | |
| 5,359,675 A | 10/1994 | Siwoff | |
| 6,580,824 B2* | 6/2003 | Deng et al. | 382/165 |
| 6,631,206 B1* | 10/2003 | Cheng et al. | 382/164 |
| 6,798,921 B2* | 9/2004 | Kinjo | 382/282 |
| 6,940,545 B1* | 9/2005 | Ray et al. | 348/222.1 |
| 7,043,474 B2* | 5/2006 | Mojsilovic et al. | 707/6 |
| 7,376,270 B2* | 5/2008 | Chen et al. | 382/167 |

FOREIGN PATENT DOCUMENTS

JP    2001309195    11/2001
JP    02004054960 A  *  2/2004

OTHER PUBLICATIONS

Shi et al., "Automatic Image Quality Improvement for Videoconferencing", IEEE, vol. 3, May 2004, pp. III-701 to III-704.*

(Continued)

*Primary Examiner*—Anh Hong Do
(74) *Attorney, Agent, or Firm*—Lee & Hayes, PLLC

(57) ABSTRACT

Video image quality may be improved by correcting exposure levels and/or enhancing contrast amounts on each frame. One or more of the following phases may be implemented: skin-color model building, face detecting, exposure level correcting, and contrast enhancing. In a described implementation, a Gaussian skin-color model is built for each image frame during runtime. The Gaussian skin-color model is built with training pixels that are selected responsive to a defined skin color range, which is created offline from manually-selected skin pixels of multiple test sequences. In another described implementation, each pixel of an image frame is re-exposed using a ratio of contrast amount control variables (CACVs). More specifically, a pixel may be converted to a corresponding light intensity using a first CACV, and the corresponding light intensity may be reconverted to a pixel using a second CACV to enhance the contrast and possibly reduce fuzziness of the image frame.

39 Claims, 14 Drawing Sheets

OTHER PUBLICATIONS

Messina et al., "Image Quality Improvement by Adaptive Exposure Correction techniques", IEEE, vol. 1, Jul. 2003, pp. I-549 to I-552.*

Bhukhanwala et al., "Automated Global Enhancement of Digitized Photographs" IEEE Trans. On Consumer Electronics vol. 40 No. 1 Feb. 1994 pp. 1-10.

Jones et al., "Statistical color models with application to skin detection" IEEE Proc. of CVPR Jun. 1999 pp. 274-280.

Messina et al., "Image Quality Improvement by Adaptive Exposure Correction Techniques" Proc. of ICME Jul. 2003 pp. 549-552.

Saitoh F., "Image Contrast Enhancement Using Genetic Algorithm" Proc. of IEEE International Conference on SMC Oct. 1999 vol. 4 pp. 899-904.

Soriano et al., "Adaptive skin color modeling using the skin locus for selecting training pixels" Pattern Recognition 36 2003 pp. 681-690.

Starck et al., "Gray and Color Image Contrast Enhancement by the Curvelet Transform" IEEE Trans. on Image Processing vol. 12 No. 6 Jun. 2003 pp. 706-717.

Yang et al., "Detecting human faces in color images" Proc. of ICIP Oct. 1998 pp. 127-130.

* cited by examiner

UNDEREXPOSED FACE
*FIG. 1A*  *Prior Art*
OVEREXPOSED FACE
*FIG. 1B*  *Prior Art*

VIDEO IMAGE QUALITY

TECHNICAL FIELD

This disclosure relates in general to improving video image quality and in particular, by way of example but not limitation, to automatically improving video image quality by (i) building and employing a Gaussian model at runtime and/or (ii) enhancing contrast.

BACKGROUND

Communication through videoconferencing has grown significantly in recent years due to the rapid development of network services and video compression techniques. In fact, videoconferencing applications are now widely used on personal computers as well as dedicated videoconferencing terminals. In videoconferencing, the image quality is not only determined by the available network bandwidth and applied video compression techniques, but it is also significantly influenced by the illumination condition. Unsatisfactory illumination conditions may lead to underexposure or overexposure of the area of interest, such as a human face.

FIGS. 1A and 1B illustrate an underexposed face 101 and an overexposed face 103, respectively, with conventional video image processing. Of these two typical cases, image 101 of the underexposed face represents scenes that possess a bright background. In image 101, the face area is underexposed because the camera's exposure level is influenced by the bright background. On the other hand, image 103 of the overexposed face represents scenes that posses a dark background, which also adversely affects the performance of conventional automatic exposure adjustments. Thus, a bright background can cause a face to appear too dark (e.g., as in underexposed face 101), and a dark background can cause a face to appear too bright (e.g., as in overexposed face 103).

Although most videoconferencing equipment, such as personal computer digital cameras, can automatically adjust the exposure level according to the illumination condition, they cannot identify the area of interest in a video image. Consequently, the automatically-adjusted exposure level may be unsatisfactory or even poor in the area of interest. With video images for videoconferencing applications, the area of interest is often a human face. When the human face is obscured due to a poor exposure level, much of the additional nonverbal communication offered by videoconferencing is unfortunately comprised.

Accordingly, there is a need for schemes and/or techniques that can efficiently improve the exposure level and/or clarity of an area of interest in video images.

SUMMARY

Video image quality may be improved by correcting exposure levels and/or enhancing contrast amounts on each frame. One or more of the following phases may be implemented: skin-color model building, face detecting using the skin-color model, exposure level correcting based on the detected face, and contrast enhancing.

In a described implementation, a Gaussian skin-color model is built for each image frame during runtime. The Gaussian skin-color model is built with training pixels that are selected responsive to a defined skin color range, which is created offline from manually-selected skin pixels of multiple test sequences and is based on calculated Gaussian distribution centers of each test sequence. A reliability examination may also be performed to ensure that the Gaussian skin-color model that is built at runtime is reliable in terms of at least one reliability range that is also produced offline.

In another described implementation, each pixel of an image frame is re-exposed using a ratio of contrast amount control variables. More specifically, a pixel may be converted to a corresponding light intensity using a first contrast amount control variable value, and the corresponding light intensity may be reconverted to a pixel using a second contrast amount control variable value to enhance the contrast and possibly reduce fuzziness of the image frame. The exposure level correcting and the contrast enhancing phases may optionally be combined into one phase.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

FIGS. 1A and 1B illustrate an underexposed face and an overexposed face, respectively, with conventional video image processing.

DETAILED DESCRIPTION

Introduction

Figure 2:
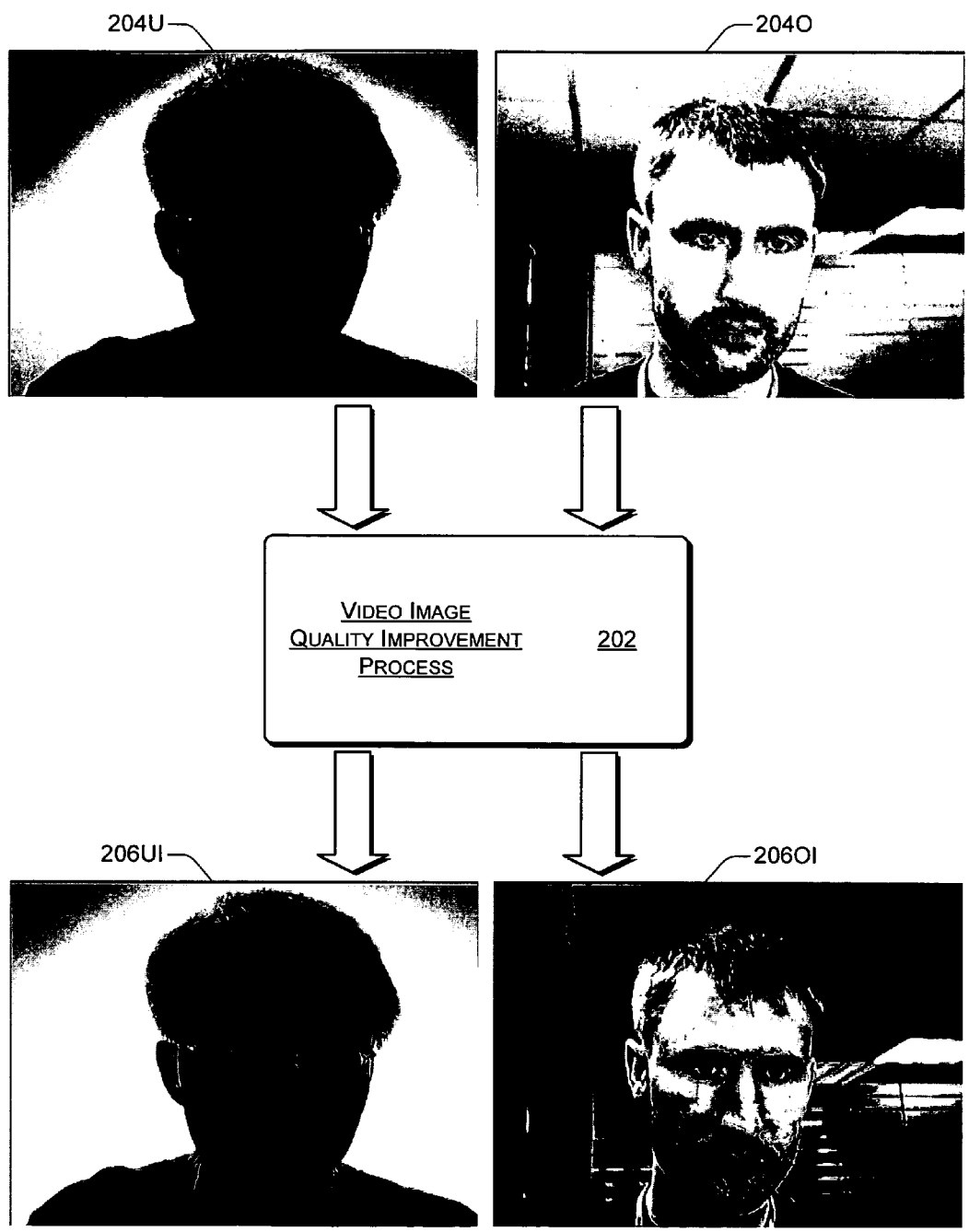
FIG. 2 illustrates original images that are applied to an example video image quality improvement process to produce improved images.

The use of videoconferencing has grown in recent years due to lower processing and bandwidth costs as well as more efficient video compression techniques. Regardless of the available bandwidth or the employed video compression technique, the resulting video images may be unappealing and/or insufficiently clear due to exposure levels. Although an overall illumination level for an image frame may be adjusted, an area of interest such as a face may remain too bright or too dark. Consequently, it can become difficult for a videoconferencing participant to discern facial expressions, detect eye movement, read nonverbal communication cues, and so forth.

To mitigate this issue, a described implementation involves automatically improving video image quality by correcting exposure and/or enhancing contrast. More specifically, an approach for automatically building a skin-color model and a scheme for enhancing contrast are both described. Techniques to reduce the computational cost are also described along with ways to incorporate them into the overall video image quality improvement process. Experimental results indicate that improvement in video image quality is visually apparent while the computational overhead is relatively small. Certain described implementations can be integrated into videoconferencing systems, including personal-computer-based systems, and are especially suitable for scenarios where low-complexity computing is beneficial. For example, automatic video image quality improvement as described herein may be incorporated into mobile videoconferencing devices.

In a described implementation, one or more of four phases are utilized in a video image quality improvement process. First, a skin-color model is built. For example, the skin-color model may be built at runtime on a frame-by-frame basis using a defined skin color range. Second, a face is detected using the skin-color model. Third, an exposure level is corrected based on the detected face. Fourth, contrast is enhanced. For example, each pixel of an image frame may be re-exposed using a ratio of contrast amount control variables. Optionally, the exposure level correction and the contrast amount enhancement may be combined into a single phase.

Overview of Video Image Quality Improvement

As described above, in videoconferencing applications a participant's face is usually the primary area of interest. It is therefore meaningful to correct the exposure level based on the area of interest (e.g., the participant's face) to improve the relevant image quality.

To automatically improve the quality of digital images, many algorithms have been developed. For example, the automated global enhancement method; which is described in S. A. Bhukhanwala and T. V. Ramabadram, "Automated Global Enhancement of Digitized Photographs", IEEE Trans. On Consumer Electronics, vol. 40, no. 1, 1994 (which is hereby incorporated by reference herein in its entirety); identifies the visually important regions within a still image and then applies re-exposure based on these regions. Also, the adaptive exposure correction method; which is described in Messina, G., Castorina, A., Battiato, S. and Bosco, A., "Image quality improvement by adaptive exposure correction techniques", Proc. of ICME 2003. pp. 549-552, July 2003 (which is hereby incorporated by reference herein in its entirety); is designed for video applications. The Messina method has three phases: First, a skin-color model is built offline from a training data set. Second, human face areas are detected using the offline model at run-time. Third, an exposure correction process is carried out on the entire image based on the intensity information of the face area.

There are several drawbacks to using the method of Messina in a practical implementation. Firstly, because accurate human skin-color distribution vastly varies in different scenes, there is not a predefined model that is universally effective in various environments. Secondly, unsatisfactory illumination conditions can also result in blurry images, and this blurry effect cannot be effectively eliminated by correcting exposure levels alone.

Consequently, improving video image quality as described in certain implementations herein is directed to addressing the first and/or the second of the aforementioned drawbacks. For example, a skin-color model can be automatically built at runtime to adapt to scene changes. Additionally, a contrast enhancement scheme can reduce if not eliminate the blurry effect and may optionally be integrated into the exposure correction process. Techniques that can reduce the computational cost for improving video image quality are also described.

FIG. 2 illustrates original images 204 that are applied to an example video image quality improvement process 202 to produce improved images 206. Original image 204U is underexposed with respect to the face displayed therein. Original image 204U is applied to video image quality improvement process 202, and video image quality improvement process 202 produces as output improved image 206UI. The underexposed face of original image 204U is visually improved inasmuch as it is no longer too dark in improved image 206UI.

Original image 204O is overexposed with respect to the face displayed therein. Original image 204O is applied to video image quality improvement process 202, and video image quality improvement process 202 produces as output improved image 206OI. The overexposed face of original image 204O is visually improved inasmuch as it is no longer too bright in improved image 206OI.

Figure 3:
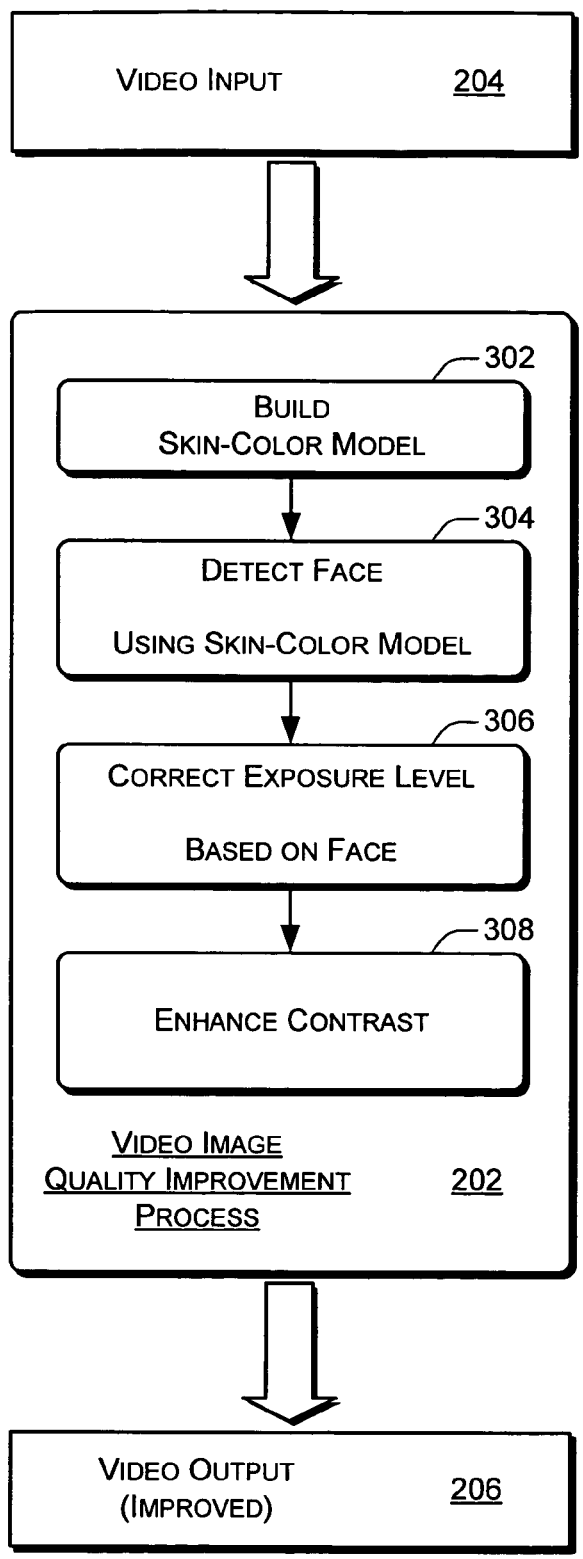
FIG. 3 illustrates multiple example actions of a video image quality improvement process that accepts video input and produces improved video output.

FIG. 3 illustrates multiple example actions 302-308 of video image quality improvement process 202 that accepts video input 204 and produces improved video output 206. As illustrated, video image quality improvement process 202 includes four (4) major actions or phases 302-308. At action 302, a skin-color model is built. For example, the skin-color model may be built at runtime on a frame-by-frame basis using a defined skin color range. At action 304, a face is detected using the skin-color model.

At action 306, an exposure level of video input 204 is corrected based on the detected face. At action 308, a contrast amount of video input 204 is enhanced. For example, each pixel of an image frame of video input 204 may be re-exposed using a ratio of contrast amount control variables. Each action of actions 302-308 need not be utilized in every described implementation. Furthermore, each action may be performed fully or partially simultaneously with the other action(s). Regardless, improved video output 206 is produced by video image quality improvement process 202 from video input 204.

Figure 4:
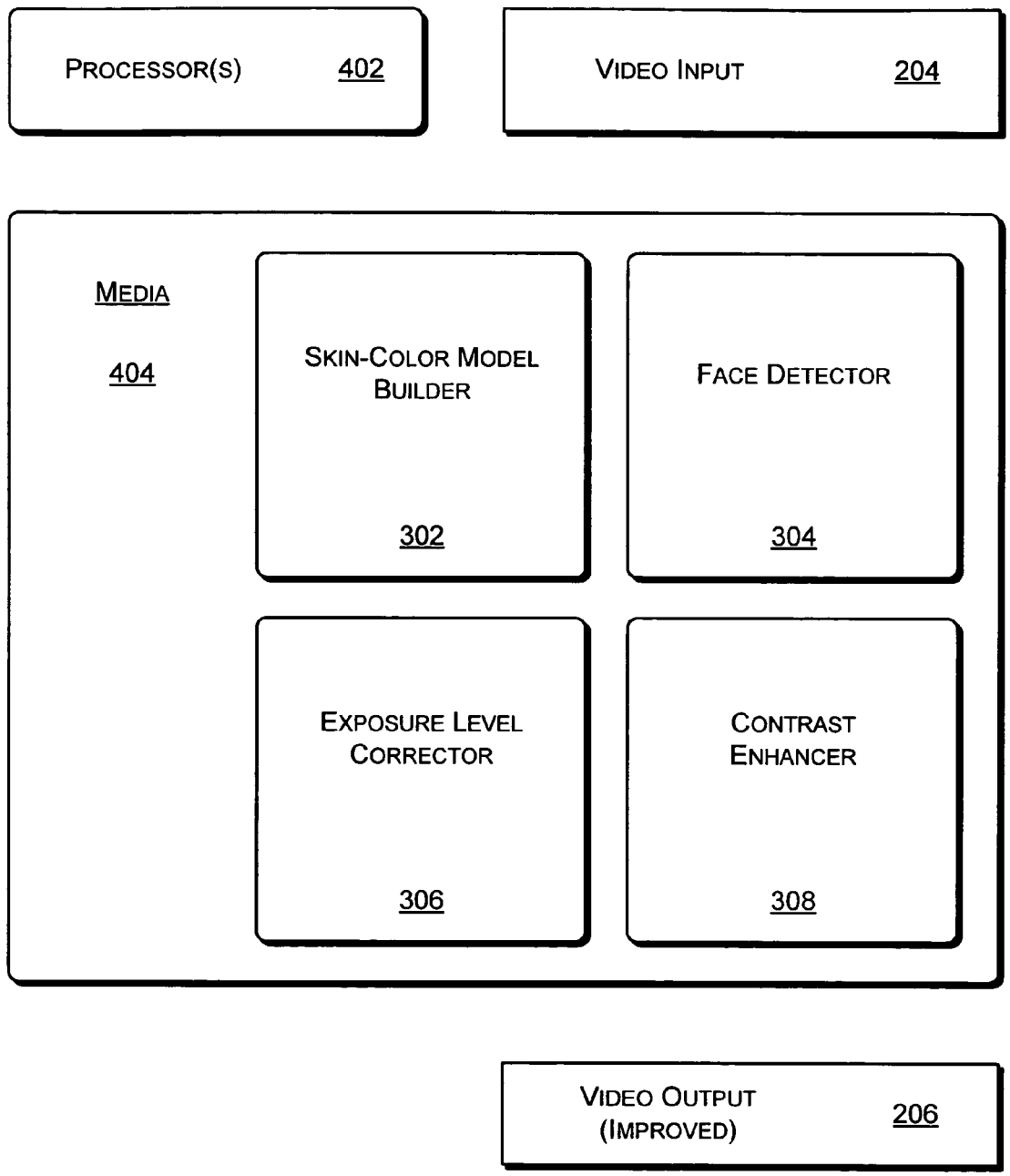
FIG. 4 illustrates multiple example components for a video image quality improvement scheme from a hardware and software perspective.

FIG. 4 illustrates multiple example components for a video image quality improvement scheme from a hardware and software perspective. Video input 204, (improved) video output 206, one or more processors 402, and media 404 are shown in FIG. 4. Although shown separately, video input 204 and/or video output 206 may be included as part of media 404. Alternatively, video input 204 and/or video output 206 may represent video input and output streams respectively, video input and output interfaces respectively, and so forth.

The components shown in FIG. 4 may be part of any given device (not separately indicated). The device may be dedicated videoconferencing equipment, a personal computer, a mobile appliance, some combination thereof, and so forth. As illustrated, such a device includes one or more processors 402 and at least one media 404. Media 404 typically includes processor-executable instructions that are executable by processor 402 to effectuate functions of a device, including functions for a video image quality improvement process 202.

Hence, video image quality improvement process 202 may also be described in terms of logic modules 302-308 comprising processor-executable instructions. As illustrated, media 404 includes a skin-color model builder 302, a face detector 304, an exposure level corrector 306, and a contrast enhancer 308. Additional description is provided further below in respective sections entitled "Examples of Skin-Color Model Building", "Examples of Face Detection", "Examples of Exposure Level Correction", and "Examples of Contrast Enhancement". Furthermore, calculation cost reductions are described in a section entitled "Examples of Computation Cost Reduction".

Media 404 may be realized as storage or transmission media, volatile or non-volatile media, removable or non-removable media, some combination thereof, and so forth. For example, media 404 may be realized as (i) a volatile random access memory (RAM), (ii) a non-volatile disk-based or flash type memory, (iii) a transmission medium, and/or (iv) a propagating signal. Additional details and examples of devices, processors, media, communication mechanisms, and so forth are described further below with reference to FIG. 14 in a section entitled "Example Operating Environment for Computer or Other Device".

Examples of Skin-Color Model Building

In a described implementation, a color-based approach is used to detect faces because of its relative simplicity and robustness. However, other approaches may alternatively be employed. Examples of other face detection techniques include, but are not limited to, those that rely on color, shape, texture, motion, some combination thereof, and so forth. Hence, a face detected using shape, motion, etc. can be used in conjunction with described implementations for exposure correction and/or contrast enhancement.

With a color-based approach, a histogram or a Gaussian (or another) model may be used for the face detection. In a described implementation, a Gaussian model is employed because of its relatively good convergence characteristic. Specifically, a two-dimensional Gaussian model is used to describe the distribution of human skin colors, and a YCbCr color space is used. However, a different dimensionality and/or a different color space may alternatively be used. The center of the Gaussian model is defined by $\mu=(\mu_{Cb}, \mu_{Cr})^T$, which is the average (e.g., mean) vector for skin pixels. Its shape is determined by the covariance matrix $\Sigma$.

The conditional probability $P(X|\mu,\Sigma)$ of a pixel with color vector X belonging to the skin color class is defined as follows:

$$P(X|\mu, \Sigma) = \frac{\exp\left[-\frac{d(X)}{2}\right]}{(2\pi) \times |\Sigma|^{\frac{1}{2}}}, \qquad (1)$$

where d(X) is the Mahalanobis distance from X to $\mu$ and is defined as:

$$d(X)=(X-\mu)^T \Sigma^{-1} (X-\mu). \qquad (2)$$

It is believed that human skin colors cluster in a relatively small range in the chrominance space. However, as noted above, it has been discovered that a predefined Gaussian model is not always effective in various differing environments. For example, a skin-color model derived for one person does not necessarily accurately represent the skin color distribution for any other person. Moreover, when a scene changes (which can occur frequently with mobile video communications), a model for a particular person becomes unreliable even for that same particular person. Consequently, an adaptive skin-color model is built and utilized as described herein.

In a described implementation, a skin-color model is built at runtime using automatically selected training data. In general, pixels that have a vector X close to the center of a Gaussian distribution $\mu$ are highly probable to be skin pixels. In short, a two-step method to ultimately build the model at runtime is adopted. First, multiple test sequences are collected for various persons and environments in an offline mode. During this offline mode, some skin pixels from each sequence are manually selected to calculate the Gaussian distribution center for each test sequence. The Gaussian distribution center results from the collected test sequences are then used to create a range of skin colors for both $\mu_{Cb}$ and $\mu_{Cr}$. From one set of example experimental results, a created and defined skin color range comprises [100, 135] for $\mu_{Cb}$ and [125, 160] for $\mu_{Cr}$. However, created skin color ranges may deviate from this example. In a second step of the two-step method, this created skin color range is used to automatically select training pixels and then build a Gaussian model at runtime for each image frame of a video.

In order to provide a correct guide for the face detection process, the Guassian model that is automatically built at runtime using the defined skin color range is subjected to a reliability examination phase prior to applying it to a face detector. The examination phase is based on the experimental observation that $\mu_{Cr}+\mu_{Cb}$ and $\mu_{Cr}-\mu_{Cb}$ also cluster in a relatively small range. The statistical results of 65 test sequences are shown in FIGS. 6A and 6B.

Figure 6A:
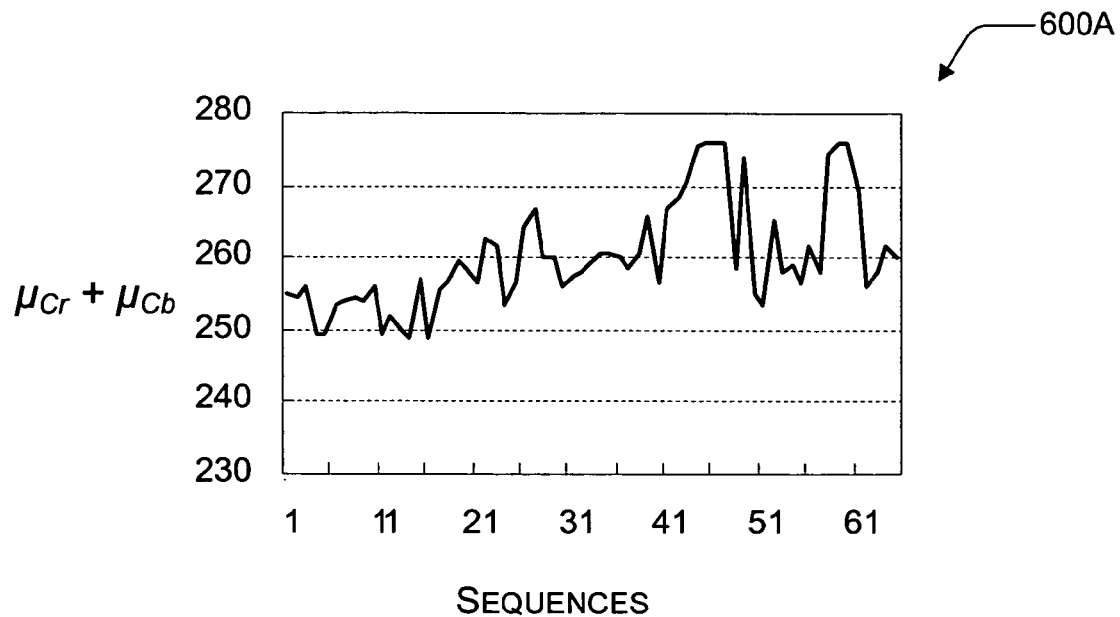
FIGS. 6A and 6B are graphs of example reliability ranges for building a skin-color model.
Figure 6B:
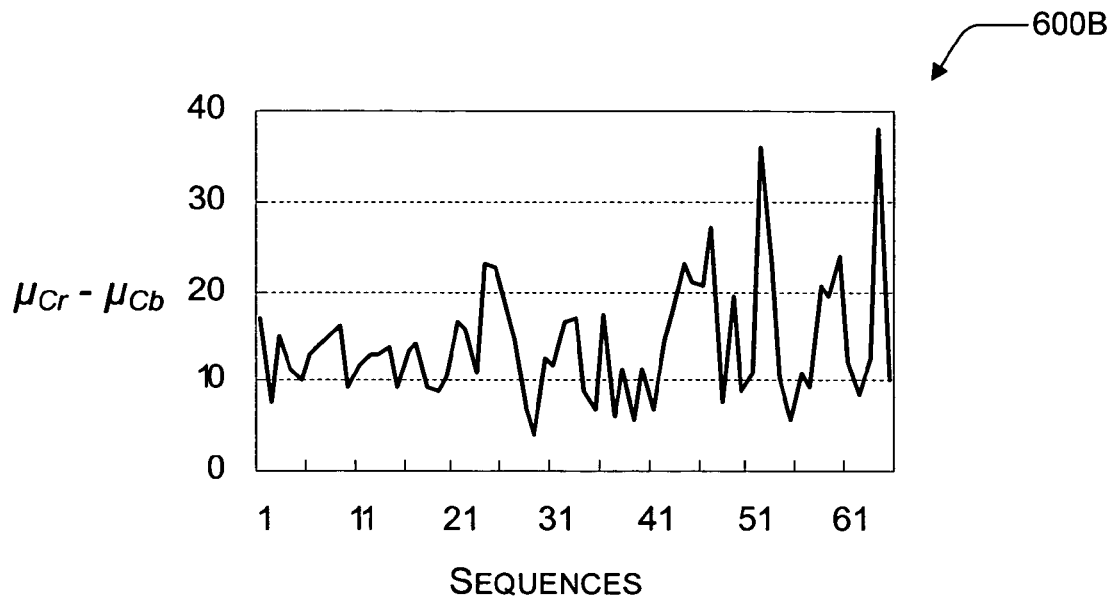

FIGS. 6A and 6B are graphs 600A and 600B, respectively, of example reliability ranges for building a skin-color model. Graph 600A corresponds to a summed reliability range for $\mu_{Cr}+\mu_{Cb}$, and graph 600B corresponds to a difference reliability range for $\mu_{Cr}-\mu_{Cb}$. The test sequences are selected from standard MPEG-4 test video clips and video clips captured from various real scenes using PC cameras. To improve the effectiveness of the reliability examination phase, the utilized ranges are slightly enlarged from the ranges depicted in graphs 600A and 600B. Example reliability ranges are [230, 280] for the sum $\mu_{Cr}+\mu_{Cb}$ and [4, 45] for the difference $\mu_{Cr}-\mu_{Cb}$; however, other values for these ranges may alternatively be selected.

The summed reliability range and/or the difference reliability range are used to examine the runtime Gaussian skin-color model for each frame. In a described implementation, if the center of a Gaussian model falls outside of these ranges, it is regarded as unreliable and is not applied in the face detector. (Instead, a Gaussian model from a previous frame is applied in the face detector.) In practice, this reliability examination phase is efficient in distinguishing between reliable and unreliable Gaussian skin-color models.

Figure 5:
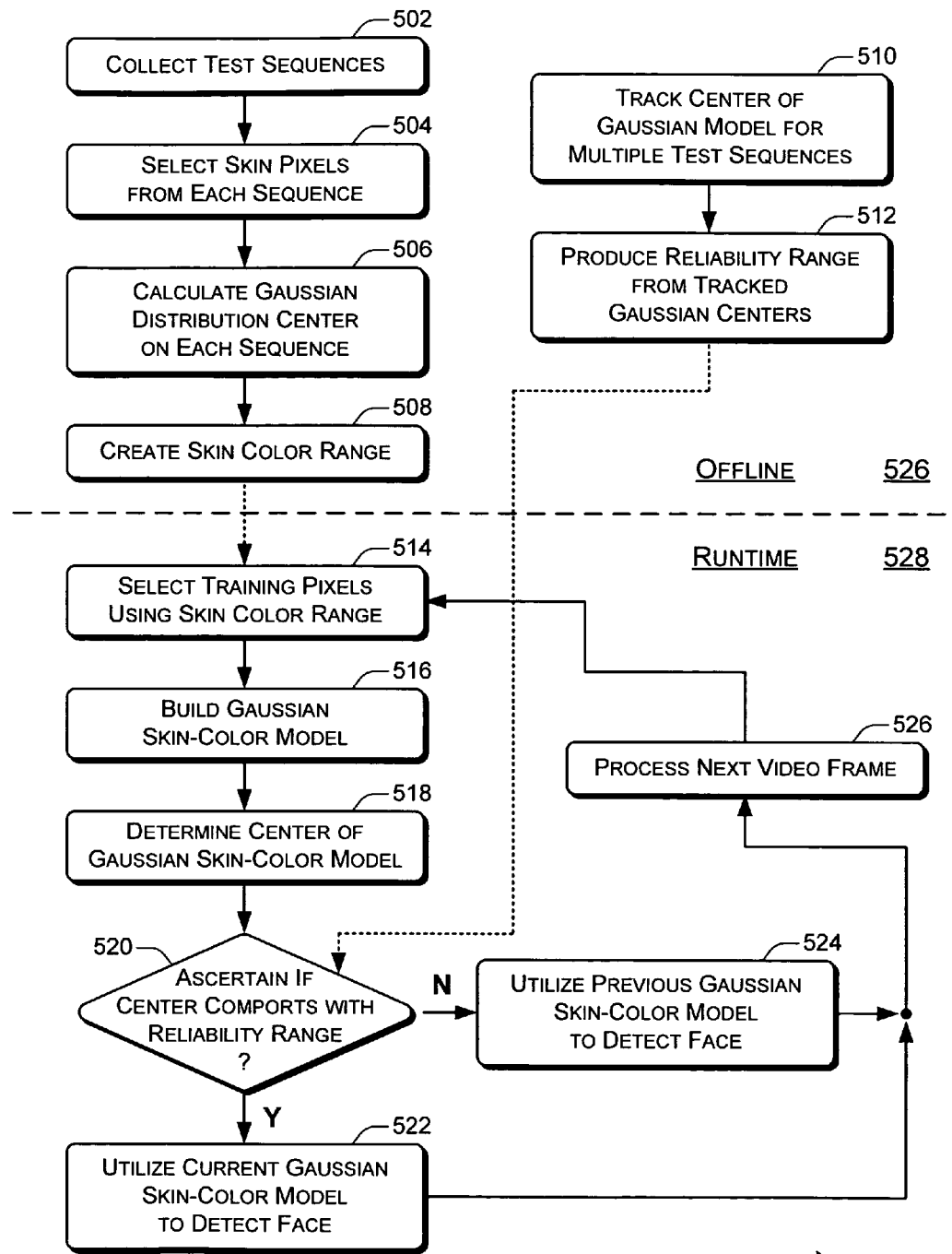
FIG. 5 is a flow diagram that illustrates an example of a method for building a skin-color model.

FIG. 5 is a flow diagram 500 that illustrates an example of a method for building a skin-color model. Flow diagram 500 is divided into offline 526 actions 502-512 and runtime 528 actions 514-526. At block 502, test sequences are collected. For example, standard MPEG sample sequences and/or real-world sequences may be collected and used as test sequences.

At block 504, skin pixels are manually selected from each sequence of the collected test sequences. At block 506, a Gaussian distribution center is calculated on each sequence for each Gaussian skin-color model that is built with regard to the manually-selected skin pixels of each sequence.

At block 508, a skin color range is created or defined using the Gaussian distribution centers calculated on each sequence. For example, a lower bound of the skin color range is defined as the minimal value of the Gaussian distribution centers from the collected test sequences, and an upper bound of the skin color range is defined as the maximal value of the Gaussian distribution centers from the collected test sequences. An example skin color range is provided above as [100, 135] for $\mu_{Cb}$ and [125, 160] for $\mu_{Cr}$.

Continuing with offline 526 actions, at block 510 the centers of Gaussian models for multiple test sequences are tracked. The test sequences for blocks 502-506 and for block 510 may differ from each other or may be the same test sequences. Moreover, the Gaussian distribution centers calculated at block 506 may be tracked for the action(s) of block 510.

At block 512, at least one reliability range is produced from the tracked Gaussian centers. In the example described above, two reliability ranges are produced: [230, 280] for the sum $\mu_{Cr} + \mu_{Cb}$ and [4, 45] for the difference $\mu_{Cr} - \mu_{Cb}$. The defined skin color range (as created at block 508) and the at least one reliability range (as produced at block 512) are provided for use during runtime 528 as indicated by the two dashed arrows.

With regard to runtime 528, the actions of blocks 514-520 and block 522 or 524 are repeated for each image frame as indicated by block 526. At block 514, training pixels are selected from a current image frame using the defined skin color range. For example, pixels in the current image frame that fit within the defined skin color range (e.g., for either or both of Cr and Cb) may be selected as training pixels. At block 516, a Gaussian skin-color model for the current image frame is built using the selected training pixels. At block 518, a center of the Gaussian skin-color model is determined.

At block 520, it is ascertained if the determined center comports with the at least one reliability range. For example, it may be ascertained if the determined center fits within the difference and/or the summed reliability ranges as described above with reference to FIGS. 6A and 6B. If the determined center is ascertained to comport with the at least one reliability range, then at block 522 the Gaussian skin-color model for the current image frame is utilized to detect a face (e.g., as described further herein below in the section entitled "Examples of Face Detection").

On the other hand, if the determined center of the Gaussian skin-color model for the current image frame is ascertained to not comport with the at least one reliability range (at block 520), then at block 524 the Gaussian skin-color model for a previous image frame (e.g., the immediately previous image frame) is utilized to detect a face in the current image frame. After the action(s) of block 522 or 524, a subsequent video image frame is processed starting at block 526 to repeat the other actions of runtime 528 for (possibly) each image frame of a video.

Examples of Face Detection

After a reliable skin-color model has been built, it can be applied to the human face detection process. In this process, each pixel of an input image frame is scanned. A scanned pixel is regarded as a skin pixel if its chrominance vector X satisfies the following criterion:

$$P(X|\mu,\Sigma) > THS\_SPP, \qquad (3)$$

where THS_SPP is a threshold for the probability of a pixel being a skin pixel (skin pixel probability threshold). This criterion can be represented by:

$$d(X) < (-2)\log(THS\_SPP \times 2\pi \times |\Sigma|^{1/2}) = THS\_DIST, \qquad (4)$$

THS_DIST is a Mahalanobis distance threshold. Because this value is fixed for each image frame, it can be calculated before the pixel scanning process. Although other values may be used, an example value for the skin pixel probability threshold THS_SPP is 0.005.

After finishing the scan process, the average (e.g., mean) luminance value (which is referred to herein as AvgGray) of those pixels that are regarded as belonging to the face is obtained. Consequently, this average luminance value can be used as a reference in the exposure correction process. To avoid flickers that may be caused by large differences of the AvgGray value between adjacent image frames, the differences are limited to a moderate range, such as ±8 for example.

To correctly guide the exposure correction process, we further examine the detection results with the following criteria in equations (5) and (6):

$$\frac{1}{Num_{face\,pixels}} \sum [d(X)]^2 < THS\_DIST^2 \times 0.75, \text{ and} \qquad (5)$$

$$Num_{face\,pixels} > \alpha \times Num_{all\,pixels}, \qquad (6)$$

where Σ represents the sum in equation (5), rather than the covariance matrix; X is the vector of the selected facial pixels, and α is set to the minimal acceptable percentage of the face regions within an image. Thus, for a detected face to pass this exposure guidance examination phase, the number of pixels that are deemed to be face pixels exceeds a predetermined percentage α of the total number of pixels in an image frame.

If the face detection results cannot pass this exposure guidance examination, or if the Gaussian skin-color model is regarded as unreliable in the previous phase (e.g., as determined by the reliability examination), the calculation for AvgGray is skipped. The AvgGray value of the previous image frame is then adopted for the exposure correction process. Because adjacent image frames in a video segment are relatively similar in general, it is highly probable that the previous AvgGray result is more reliable than the current one corresponding to a detected face that failed to pass the exposure guidance examination.

Figure 8:
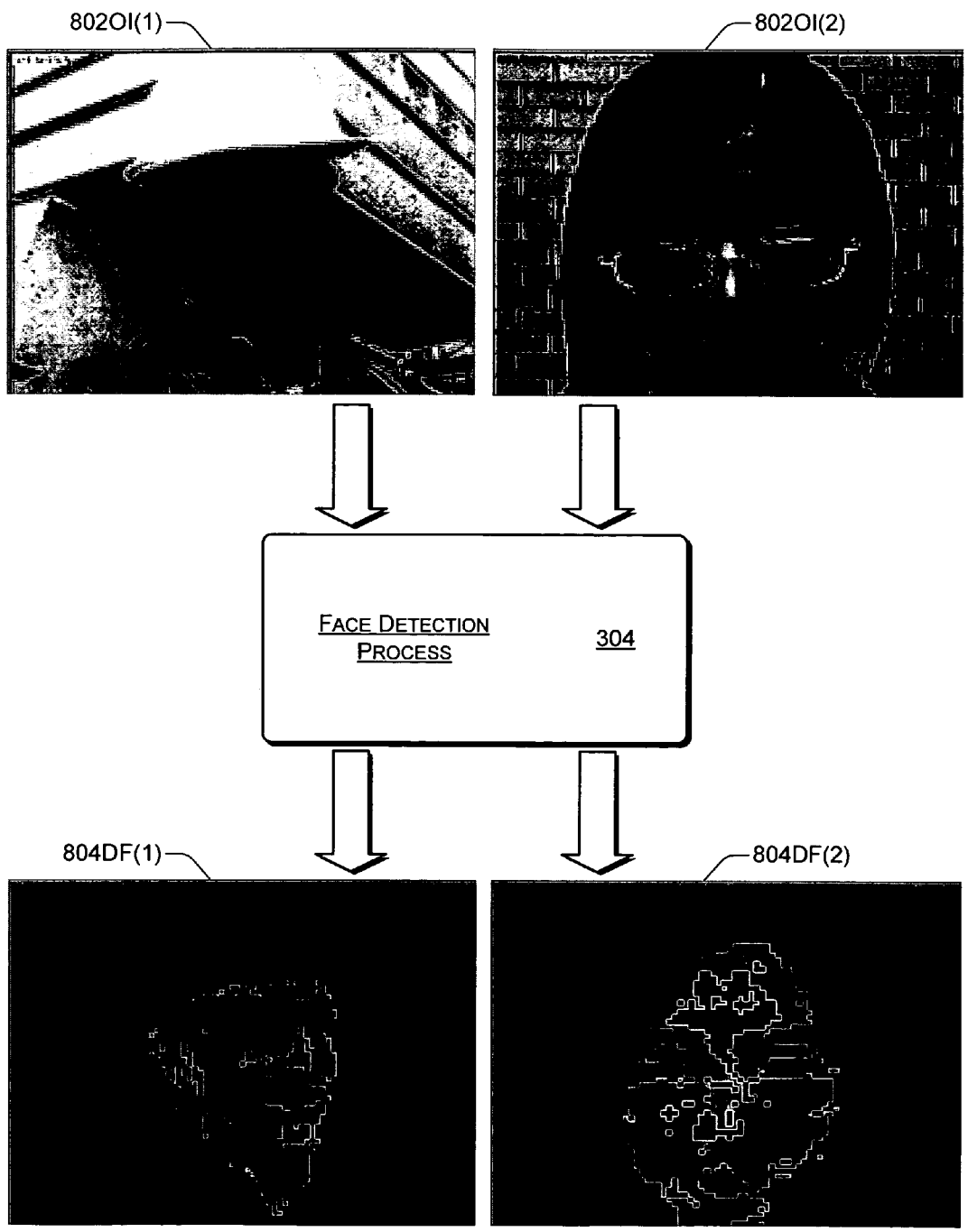
FIG. 8 illustrates original images that are applied to an example face detection process to produce detected faces.

FIG. 8 illustrates original images 802OI that are applied to an example face detection process 304 to produce detected faces 804DF. Original image 802OI(1) is an image frame from an MPEG-4 test video clip. Original image 802OI(1) is applied to face detection process 304, and face detection process 304 produces as output detected face image 804DF(1). Pixels corresponding to a substantial portion of the face in original image 802OI(1) are detected.

Original image 802OI(2) is an image frame from a video clip that is captured from a real scene. Original image 802OI(2) is applied to face detection process 304, and face detection process 304 produces as output detected face image 804DF(2). Pixels corresponding to a substantial portion of the face in original image 802OI(2) are detected.

Figure 7:
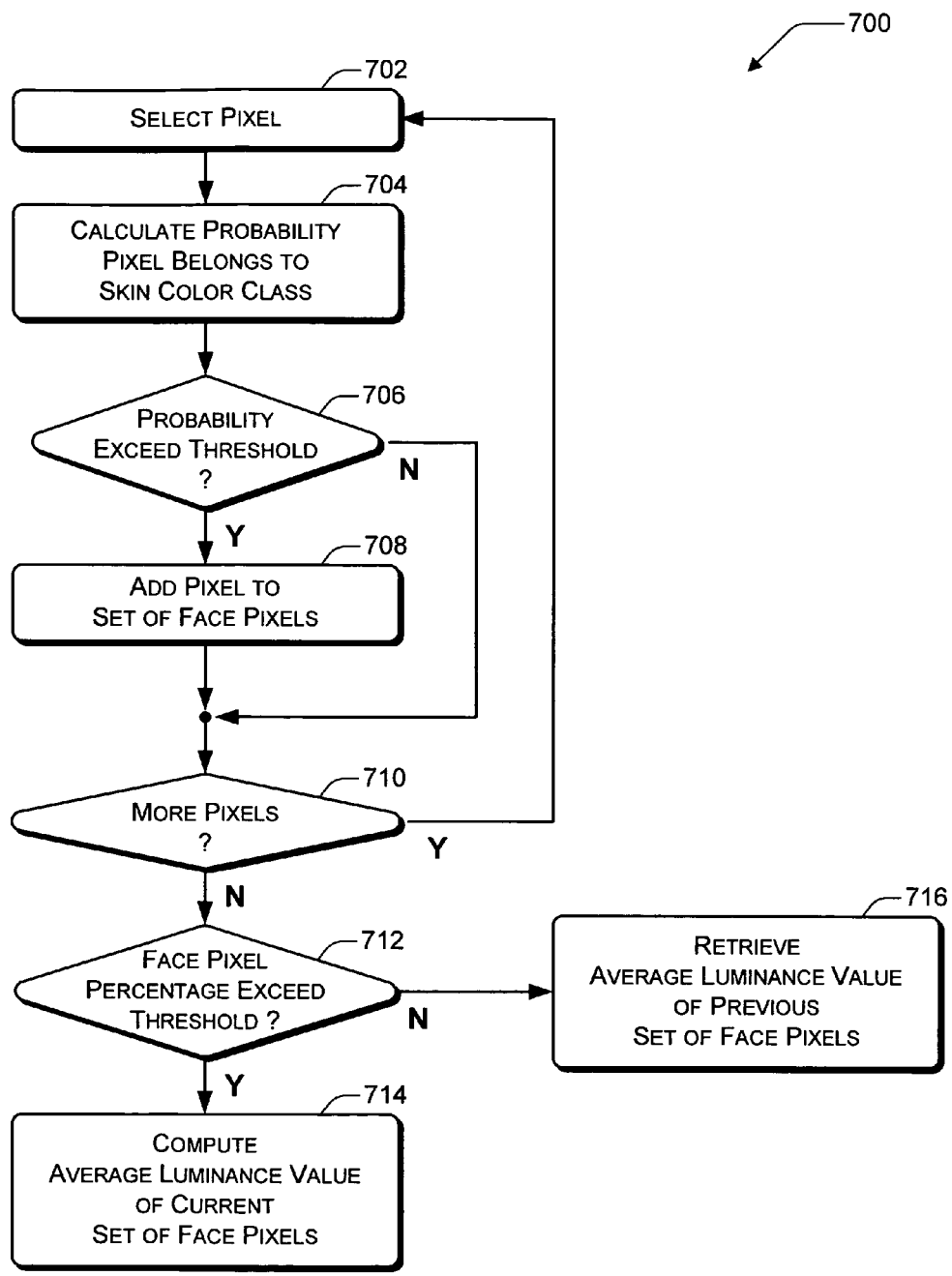
FIG. 7 is a flow diagram that illustrates an example of a method for detecting a face.

FIG. 7 is a flow diagram 700 that illustrates an example of a method for detecting a face. Flow diagram 700 includes eight (8) blocks 702-716. At block 702, a pixel is selected for scanning from a current image frame. At block 704, a probability that the selected pixel belongs to a skin color class is calculated. For example, this conditional probability may be calculated in accordance with equations (1) and (2) above using the selected pixel's chrominance values from its color vector X.

At block 706, it is determined if the calculated probability exceeds a predetermined threshold probability. For example, the calculated probability for the selected pixel may be compared to a skin pixel probability threshold in accordance with equation (3) above. If the probability of the selected pixel exceeds the predetermined threshold probability (as determined at block 706), then at block 708 the selected pixel is added to a set of face pixels. Regardless, at block 710 it is determined if there are additional pixels in the current image frame that have not yet been scanned.

If there are additional pixels to be scanned in the current image frame (as determined at block 710), the method of flow diagram 700 continues by selecting another pixel at block 702. Otherwise, the method continues at block 712 in which it is determined if the percentage of pixels detected to be face pixels in the current image frame exceeds a predetermined face percentage threshold. For example, the inequality of "equation" (6) above may be applied. Although not explicitly illustrated in flow diagram 700, an exposure guidance examination phase may also implement action(s) for equation (5) above in addition to those for equation (6). In other words, for a face detection to pass the exposure guidance examination, the detected face may be examined with regard to equation (5) and/or equation (6).

If the percentage of pixels detected to be face pixels in the current image frame is determined to exceed a predetermined face percentage threshold, an average luminance value is computed on the current set of face pixels at block 714. If, on the other hand, the percentage of pixels detected to be face pixels in the current image frame does not exceed a predetermined face percentage threshold (as determined at block 712), then at block 716 an average luminance value of a set of face pixels for a previous image frame is retrieved. In either case, the average luminance value of the (current or previous) set of face pixels is utilized as an aide in correcting the exposure level in the succeeding phase.

Examples of Exposure Level Correction

In a described implementation, an exposure-density function is used to simulate a camera's activities. The function approximates how incoming light intensities S (which is referred to as exposure) are transformed by the camera's sensor to pixel values I. This exposure-density function approximates the transformation as shown in the following equation:

$$I = f(S) = \frac{255}{1 + e^{-A \times S}}, \quad (7)$$

where the constant A is used to control the contrast amount and is termed the contrast amount control variable. Two curves in FIG. 12A, which is described further below, demonstrate the relationship between actual light intensities S and luminance pixel values I with different values of the contrast amount control variable A.

In a described implementation, the exposure correction process involves adjusting the average exposure of at least the area of interest towards an ideal exposure level. In video conferencing applications, the area of interest is typically a participant's face. The ideal exposure level is usually considered to be the midpoint of the available range of values. With 256 gray levels, for example, the ideal exposure level corresponds to the gray level of 128. Final pixel values are then computed using equation (7) above along with the corrected exposure levels.

The exposure correction process is performed on the entire image frame to preserve the image's harmony in the following manner: First, a difference between the ideal exposure and the average exposure in the area of interest is calculated with equation (8) as follows:

$$\text{Diff} = f^{-1}(128) - f^{-1}(\text{AvgGray}), \quad (8)$$

in which the "128" value corresponds to the midpoint of the available range of exposure values.

Each pixel of the current image frame is then re-exposed responsive to the calculated difference. More specifically, each pixel is re-exposed in accordance with equations (9) and (10):

$$S = f^{-1}(I) + \text{Diff, and} \quad (9)$$

$$I' = f(S). \quad (10)$$

With equation (9), each pixel is converted (approximately) to its original light intensity counterpart "S" and then the difference Diff is added thereto to produce a new light intensity S. This new, exposure-corrected light intensity S is then reconverted to a new, exposure-corrected pixel value I' with equation (10).

With reference again to FIG. 2, the underexposed and the overexposed original images 204U and 204O, respectively, can be improved as evidenced by the improved images 206. Improved images 206, after undergoing the above-described exposure correction process, have improved exposure levels particularly in the facial area and still have the overall harmony of each image being preserved.

Figure 10A:
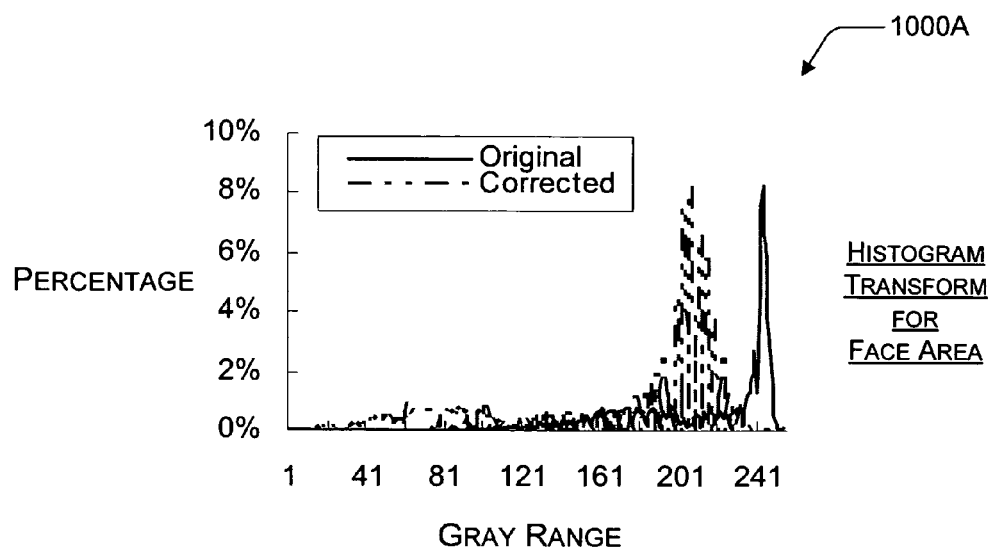
FIGS. 10A and 10B are graphs of example histogram transforms for an exposure level correction.
Figure 10B:
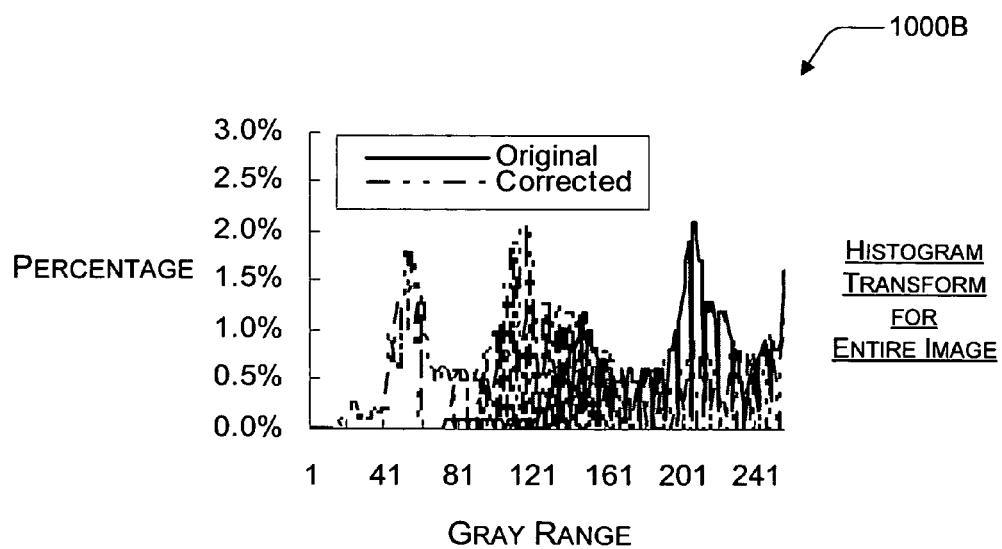

FIGS. 10A and 10B are graphs 1000A and 1000B, respectively, of example histogram transforms for an exposure level correction. Specifically, graphs 1000A and 1000B show the transform of the gray scale histogram from original (overexposed) image frame 204O to improved image frame 206OI (of FIG. 2). In graphs 1000A and 1000B, the histograms for original image 204O are depicted with solid lines, and the histograms for improved image 206OI are depicted with dashed lines.

For both graphs 1000A and 1000B, values along the abscissa axis are gray scales ranging from 0 to 255, and values along the ordinate axis are percentages ranging from 0-10% and 0.0-3.0%, respectively. Graph 1000A illustrates a histogram transform for the facial area of images 204O and 206OI, and graph 1000B illustrates a histogram transform for the entire frame of images 204O and 206OI. It is apparent from the histogram transforms of graphs 1000A and 1000B that the majority of the gray values of the face area and indeed the entire image are transformed towards the mid-tone of the available range of values.

Figure 9:
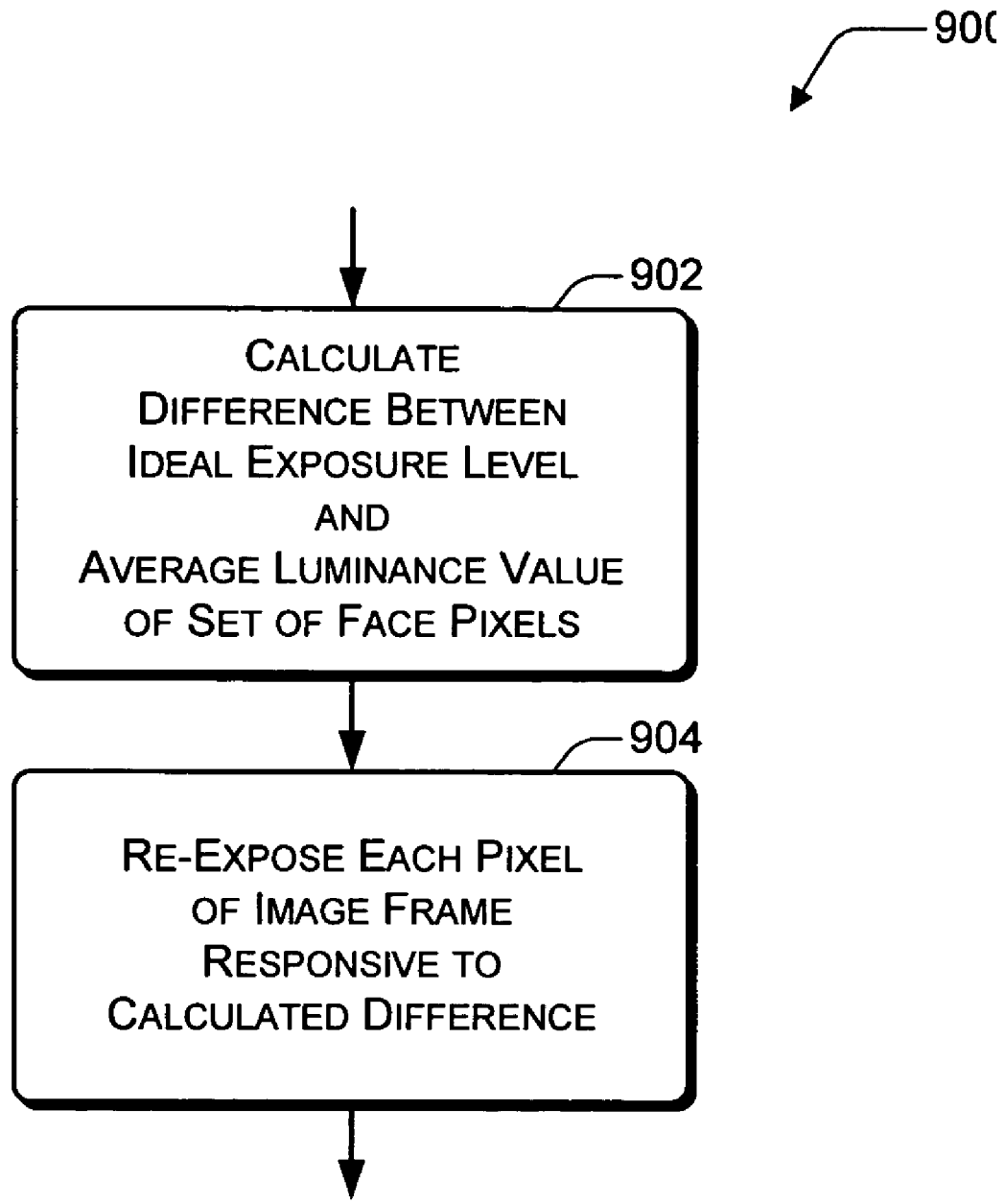
FIG. 9 is a flow diagram that illustrates an example of a method for correcting an exposure level.

FIG. 9 is a flow diagram 900 that illustrates an example of a method for correcting an exposure level. Flow diagram 900 includes two (2) blocks 902-904. At block 902, a difference between an ideal exposure level and an average luminance value of a set of face pixels is calculated. For example, a difference between (i) a midpoint of a range of available exposure values and (ii) a mean luminance value of an area of interest (such as a face) may be calculated in accordance with equation (8) above.

At block 904, each pixel of an image frame is re-exposed responsive to the calculated difference. For example, each pixel of an original image frame may be re-exposed responsive to the calculated difference in accordance with equations (9) and (10) above to produce an improved image frame. The re-exposed pixels form an improved image frame inasmuch as the exposure level of at least the area of interest is moved toward the mid-tone.

Examples of Contrast Enhancement

As noted above, unsatisfactory illumination conditions can also in practice cause a blurry effect. This blurriness issue cannot be completely solved by correcting exposure levels alone. Consequently, a contrast enhancement process is also utilized to further eliminate any blurry effects (e.g., from poor illumination).

In a described implementation, contrast enhancement involves gray scale stretching of a digital image. Two relevant aspects of contrast enhancement as described include: (i) an approach entails re-exposing an image frame using the exposure-density function (e.g., of equation (7)) to achieve an enhancement of the contrast of the image frame and (ii) it can optionally be integrated with the exposure correction process. Initially, the contrast enhancement process is described as being separately performed after the exposure correction process. A technique to integrate these two processes is described further below in a section entitled "Examples of Computation Cost Reduction".

As noted in the preceding section entitled "Examples of Exposure Level Correction", the constant A is used to control the contrast amount and is termed the contrast amount control variable. Contrast enhancement may be implemented with the following two equations (11) and (12):

$$S = f_1^{-1}(I), \text{ and} \qquad (11)$$

$$I' = f_2(S), \qquad (12)$$

where $f_1^{-1}$ and $f_2$ are the reverse and forward computations, respectively, of equation (7) above. Hence, pixels I (which are already exposure-corrected in this example implementation) are first converted to their corresponding light intensities "S", and then the corresponding light intensities "S" are reconverted to new, contrast-enhanced pixels I'. However, each conversion uses different contrast amount control variable values for the As. Specifically, $f_1^{-1}$ and $f_2$ use the variables $A_1$ and $A_2$, respectively, as their contrast amount control variable parameters. The contrast amount control variable $A_1$ is smaller than the contrast amount control variable $A_2$. In practice, $A_1$ and $A_2$ may be selected based on experimentation. Although other values may be utilized, an example range for $A_1$ is [0.7, 1.0], and an example range for $A_2$ is [1.0, 1.3].

Figure 12A:
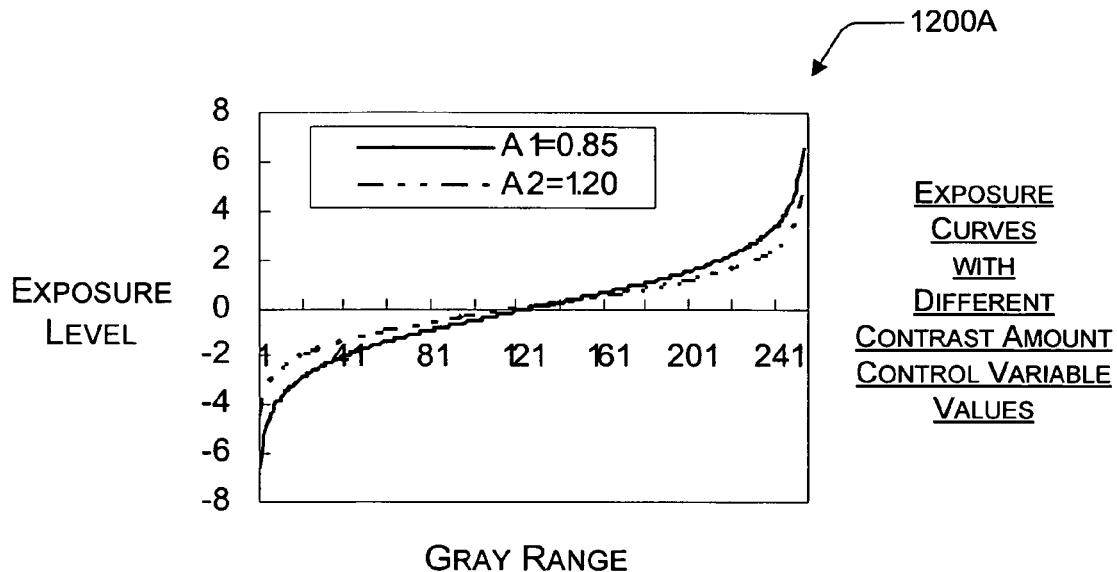
FIGS. 12A and 12B are graphs of example curves that illustrate utilization of different contrast amount control variable values and that illustrate transformed values, respectively.
Figure 12B:
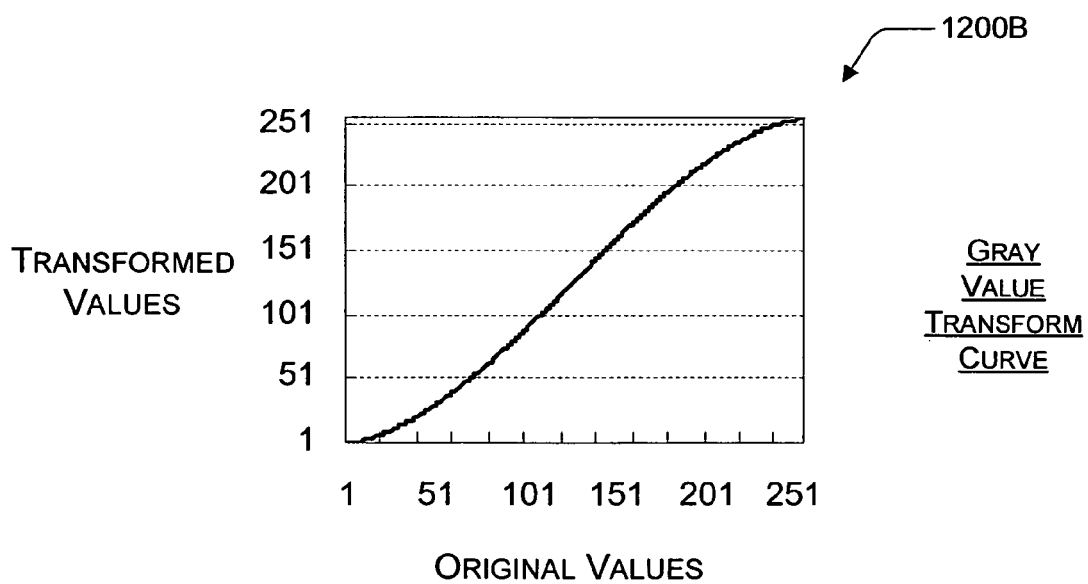

FIGS. 12A and 12B are graphs 1200A and 1200B, respectively, of example curves that illustrate utilization of different contrast amount control variable values A and that illustrate transformed values, respectively. Graph 1200A graphs gray range versus exposure level and shows two exposure curves with different values of A. Specifically, the solid line curve represents a contrast amount control variable $A_1 = 0.85$, and the dashed line curve represents a contrast amount control variable $A_2 = 1.20$. Equations (11) and (12) correspond to mapping points of the $A_1$ curve to points in the $A_2$ curve in the exposure field. With $A_2$ being bigger than $A_1$, the exposure curve is somewhat flattened along the middle range of gray values as a result of the contrast enhancement process.

Graph 1200B graphs original gray values versus transformed gray values. Thus, it illustrates how original gray values I are transformed to the final pixel values I' using equations (11) and (12) above. From graph 1200B, it can be discerned that the slope of the middle region of the curve is larger than the slope of the saturation regions at both ends. Consequently, the gray scale range of the middle region is stretched. In other words, the gray values of the area of interest that have been enhanced are located in this middle region.

Figure 11:
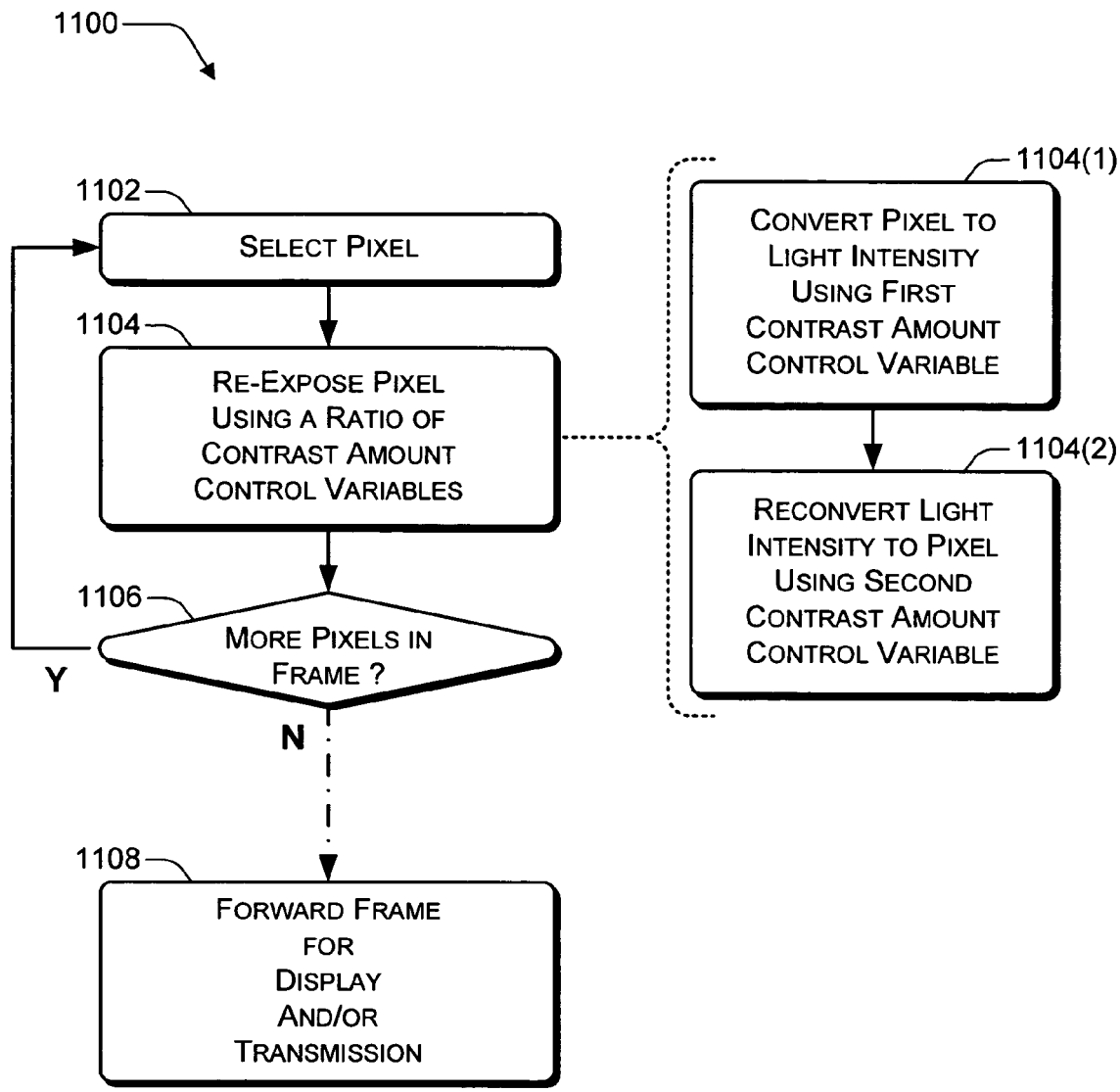
FIG. 11 is a flow diagram that illustrates an example of a method for enhancing a contrast amount of a video frame.

FIG. 11 is a flow diagram 1100 that illustrates an example of a method for enhancing a contrast amount of a video frame. Flow diagram 1100 includes six (6) blocks 1102-1108, 1104(1), and 1104(2). At block 1102, a pixel of a current image frame is selected. For example, a pixel of a current image frame that has already been corrected for exposure level may be selected for contrast enhancement. At block 1104, the selected pixel is re-exposed using a ratio of contrast amount control variables. For example, the selected pixel may be re-exposed using equations (11) and (12) above with a lower-valued contrast amount control variable for equation (11) than for equation (12) (i.e., a ratio of contrast amount control variables $A_1$ to $A_2$).

By way of example, the action(s) of block 1104 may be further divided into those of blocks 1104(1) and 1104(2). At block 1104(1), the selected pixel may be converted to a corresponding light intensity using a first contrast amount control variable. For example, the selected pixel I may be converted to its corresponding light intensity "S" using equation (11) above and a first contrast amount control variable value $A_1$. At block 1104(2), the corresponding light intensity is reconverted to a pixel value using a second contrast amount control variable. For example, the corresponding light intensity "S" may be reconverted to a contrast enhanced pixel value I' using equation (12) above and a second contrast amount control variable value $A_2$. In a described implementation, the first contrast amount control variable value $A_1$ is less than the second contrast amount control variable value $A_2$ to reduce the blurry effect.

At block 1106, it is determined if there is another pixel in the current image frame that has yet to undergo contrast enhancement. If so, then another pixel is selected at block 1102. On the other hand, if all pixels have been submitted to the contrast enhancement process (as determined at block 1106), then at block 1108 the exposure corrected and contrast enhanced current image frame is forwarded for display and/or transmission.

Figure 13:
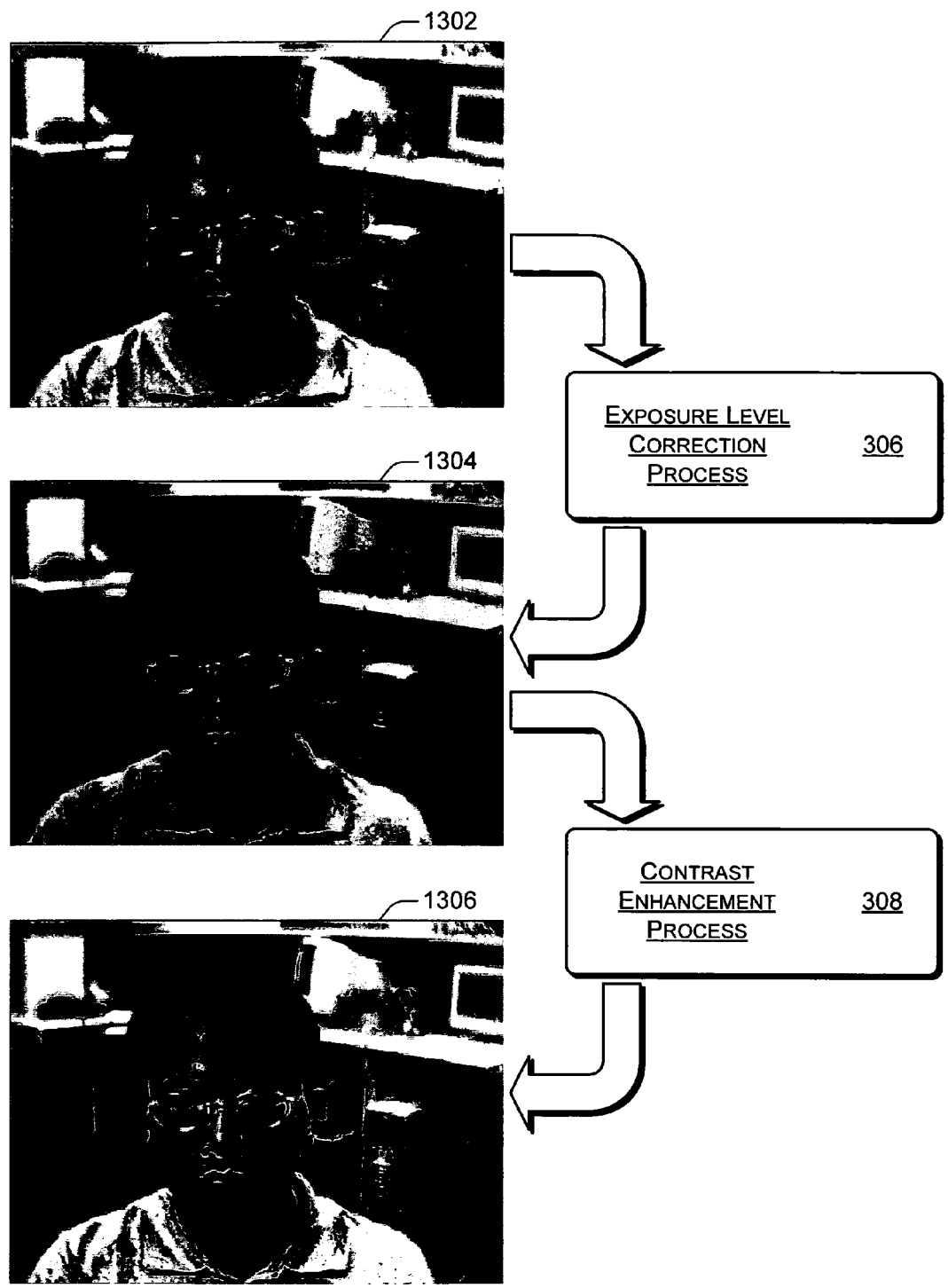
FIG. 13 illustrates an original image that is applied to an example exposure level correction process to produce an exposure-level-corrected image, which is applied to an example contrast enhancement process to produce another image that is improved with respect to both exposure and contrast.

FIG. 13 illustrates an original image 1302 that is applied to an example exposure level correction process 306 to produce an exposure-level-corrected image 1304, which is applied to an example contrast enhancement process 308 to produce another image 1306 that is improved with respect to both exposure and contrast. Image frames 1302, 1304, and 1306 enable a subjective evaluation of an image captured in a real scene using a personal computer digital camera. Exposure-corrected image frame 1304 looks superior to original image frame 1302, but it nevertheless has visible blurriness. On the other hand, exposure-corrected and contrast-enhanced image frame 1306 looks clearer and sharper than either of the other two images 1302 or 1304; thus, the visual effect is also better.

Examples of Computation Cost Reduction

In general, reducing the complexity of a computing process is significant when the computing process is used in real-time video communications. In this section, several techniques that can accelerate the execution and/or reduce the computational complexity of the entire algorithm are described.

Combining Exposure Correction and Contrast Enhancement

Exposure correction and contrast enhancement processes can be integrated. Equations (9), (10), (11), and (12) are combined to arrive at equations (13) and (14) as follows:

$$S = f_1^{-1}(I) + \text{Diff, and} \quad (13)$$

$$I' = f_2(S). \quad (14)$$

The "Diff" variable in equation (13) is determined in accordance with equation (8). The two different contrast amount control variables $A_1$ and $A_2$ forming the ratio thereof are utilized in $f_1^{-1}$ and $f_2$, respectively. The final pixel luminance results I' of equation (14) are the same as performing exposure correction and contrast enhancement individually (e.g., with equations (9-12)), but the computation is substantially reduced.

Using Lookup Table(s)

In experiments of applying an implementation of the entire algorithm without complexity reduction to a typical underexposed video image sequence and a typical overexposed video image sequence in QVGA format, the average frame rates achieved on a personal computer with a 1.4 GHz Pentium 4 processor are approximately 24 frames per second (fps). Investigation of the computational distribution of the entire algorithm indicates that the integrated exposure correction and contrast enhancement processes (e.g., equations (13) and (14)) consume the majority of the execution time. Thus, it can be beneficial in particular to accelerate the computation of the two equations (13) and (14).

For this acceleratory technique, one or more lookup tables are utilized. For example, the computation of equation (13) can be accelerated by using a one-dimensional lookup table that maps I to S for a given value of Diff. In other words, for an image frame, the value of Diff is computed once and then used to construct the lookup table.

On the other hand, the computation of equation (14) cannot be so easily replaced by directly indexing a lookup table because S is previously obtained by the nonlinear equation (13). However, because $f_2$ is monotonic (i.e., I' increases with S), the sign of Diff indicates the correction direction. A second one-dimensional table is therefore created using $f_2^{-1}$. The input I is then used as the starting point to search in the lookup table in the direction indicated by the sign of Diff. The index value corresponding to the element that most closely approximates S is the desired result. In practice, this result can usually be found with a few comparisons.

Moreover, a third lookup table mapping I to I' can be established at run-time, so that the above process can be replaced by directly indexing this third table. By using these lookup tables, the complexity of effectively computing equations (13) and (14) is significantly reduced.

In short, three lookup tables can be used to implement equations (13) and (14). The first lookup table is used to replace the function $f_1^{-1}$ in equation (13), and the second lookup table is used to map I to S using the function $f_2$ in equation (14). As the range of values for I is [0,255] (e.g., in an environment with 256 gray levels), these first two lookup tables can be developed offline. At runtime, the third lookup table can be generated to map I to I'.

Modulating Frequency of Image Frame Analysis

Considering the temporal similarity of video clips from one image frame to another proximate image frame, skin-color model building and face detection can be performed at a defined interval that is less than every frame. For example, the defined interval may be every five frames. However, other defined intervals may alternatively be used. A detected face and an average luminance value derived therefrom are then used for exposure correction and/or contrast enhancement throughout the duration of the defined interval.

Accepting Adequately Exposed Image Frames

If the AvgGray value computed during the face detection phase is relatively close to the ideal level (e.g., falling in the range of [124, 132]), the remaining phases can be skipped because the currently-analyzed image frame likely already has a satisfactory visible appearance.

Using a combination of these acceleratory techniques, more than 800 fps can be processed in the context of the experimental condition delineated above in the lookup table subsection.

Conclusion

In one described implementation, video image quality is automatically improved with the following three phases. First, a skin-color Gaussian model is automatically built at runtime to provide adaptations to scene changes. Second, human face areas are detected using the skin-color Gaussian model. Third, an integrated exposure correction and contrast enhancement process is effectuated based on the gray information of the detected face areas. Additionally, the raw computational costs of improving video image quality may be reduced by implementing some of the techniques as described herein.

In another described implementation, multiple processing modules execute automatic image quality improvement. Given an input image, a skin-color Gaussian model is automatically built for the image at run-time by a model building module (e.g., skin-color model builder 302 of FIG. 4). The results, including the center of the Gaussian model μ and the corresponding covariance matrix Σ, are forwarded to a face detection module (e.g., face detector 304). The face detection module detects the pixels belonging to a human face in the image and calculates the average luminance value (e.g., the AvgGray value) of those pixels that are deemed to belong to the detected face. This value is used as a reference point in the succeeding exposure correction and contrast enhancement module(s) (e.g., exposure level corrector 306 and contrast enhancer 308). This module corrects the exposure level and enhances the image's contrast substantially simultaneously. The improved (e.g., corrected and/or enhanced) image is then output from the exposure correction and contrast enhancement module.

The devices, actions, aspects, features, procedures, modules, components, etc. of FIGS. 1-13 are illustrated in diagrams that are divided into multiple blocks. However, the order, interconnections, interrelationships, layout, etc. in which FIGS. 1-13 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for improving video image quality. Furthermore, although the description herein includes references to specific implementations (including a general device of FIG. 14), the illustrated and/or described implementations can be implemented in any suitable hardware, software, firmware, or combination thereof and using any suitable device architecture(s), video coding algorithms(s), threshold value(s), modeling equation(s), detected areas(s) of interest, and so forth.

Example Operating Environment for Computer or Other Device

Figure 14:
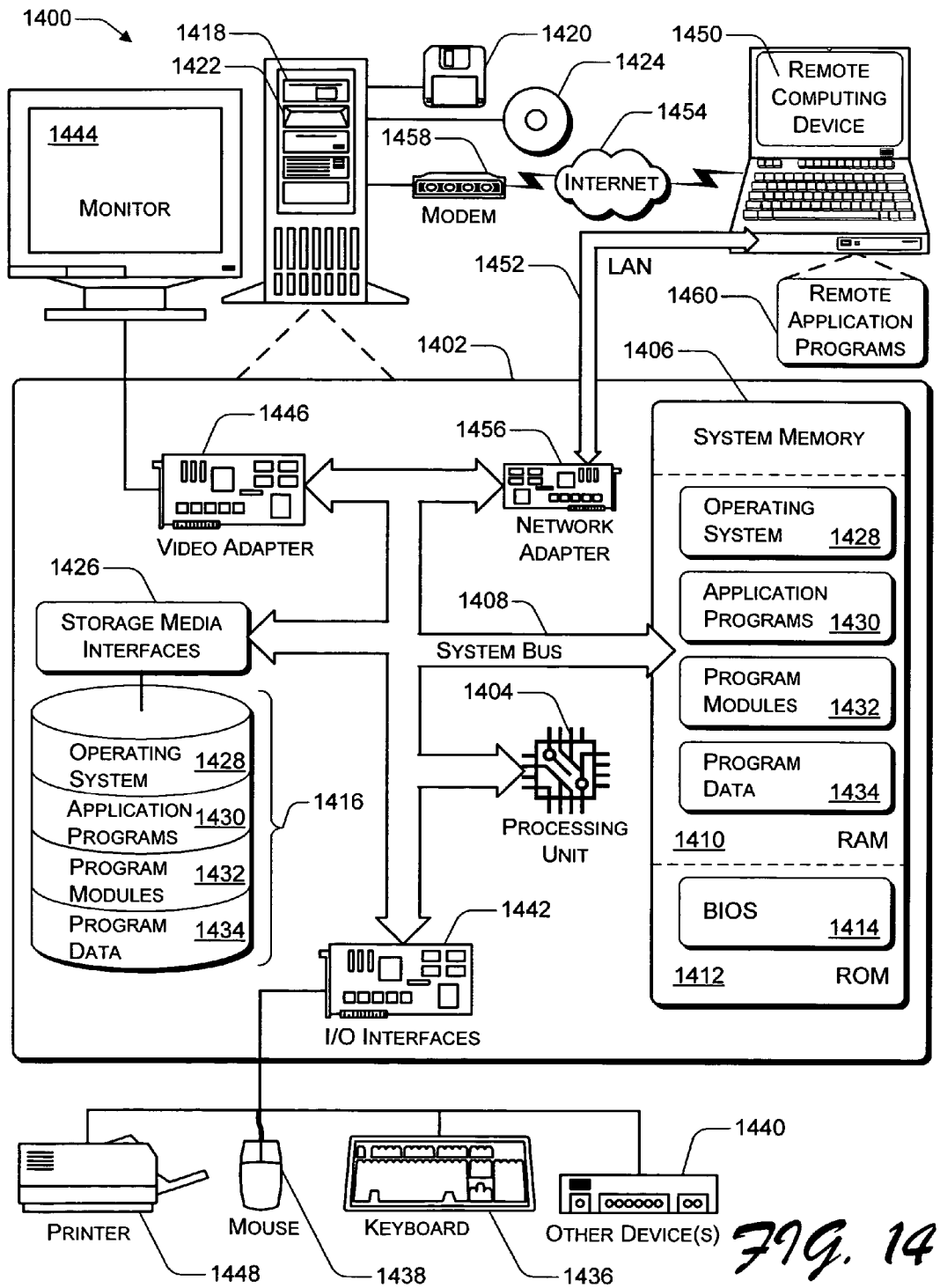
FIG. 14 illustrates an example of a computing (or general device) operating environment that is capable of (wholly or partially) implementing at least one aspect of improving video image quality as described herein.

FIG. 14 illustrates an example computing (or general device) operating environment 1400 that is capable of (fully or partially) implementing at least one system, device, apparatus, component, arrangement, protocol, approach, method, procedure, media, API, some combination thereof, etc. for improving video image quality as described herein. Operating environment 1400 may be utilized in the computer and network architectures described below.

Example operating environment 1400 is only one example of an environment and is not intended to suggest any limitation as to the scope of use or functionality of the applicable device (including computer, network node, entertainment device, mobile appliance, general electronic device, etc.) architectures. Neither should operating environment 1400 (or the devices thereof) be interpreted as having any dependency or requirement relating to any one or to any combination of components as illustrated in FIG. 14.

Additionally, video image quality improvement may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for the improvement of video image quality may be described in the general context of processor-executable instructions. Generally, processor-executable instructions include routines, programs, protocols, objects, interfaces, components, data structures, etc. that perform and/or enable particular tasks and/or implement particular abstract data types. Improving video image quality, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 1400 includes a general-purpose computing device in the form of a computer 1402, which may comprise any (e.g., electronic) device with computing/processing capabilities. The components of computer 1402 may include, but are not limited to, one or more processors or processing units 1404, a system memory 1406, and a system bus 1408 that couples various system components including processor 1404 to system memory 1406.

Processors 1404 are not limited by the materials from which they are formed or the processing mechanisms employed therein. For example, processors 1404 may be comprised of semiconductor(s) and/or transistors (e.g., electronic integrated circuits (ICs)). In such a context, processor-executable instructions may be electronically-executable instructions. Alternatively, the mechanisms of or for processors 1404, and thus of or for computer 1402, may include, but are not limited to, quantum computing, optical computing, mechanical computing (e.g., using nanotechnology), and so forth.

System bus 1408 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1402 typically includes a variety of processor-accessible media. Such media may be any available media that is accessible by computer 1402 or another (e.g., electronic) device, and it includes both volatile and non-volatile media, removable and non-removable media, and storage and transmission media.

System memory 1406 includes processor-accessible storage media in the form of volatile memory, such as random access memory (RAM) 1410, and/or non-volatile memory, such as read only memory (ROM) 1412. A basic input/output system (BIOS) 1414, containing the basic routines that help to transfer information between elements within computer 1402, such as during start-up, is typically stored in ROM 1412. RAM 1410 typically contains data and/or program modules/instructions that are immediately accessible to and/or being presently operated on by processing unit 1404.

Computer 1402 may also include other removable/non-removable and/or volatile/non-volatile storage media. By way of example, FIG. 14 illustrates a hard disk drive or disk drive array 1416 for reading from and writing to a (typically) non-removable, non-volatile magnetic media (not separately shown); a magnetic disk drive 1418 for reading from and writing to a (typically) removable, non-volatile magnetic disk 1420 (e.g., a "floppy disk"); and an optical disk drive 1422 for reading from and/or writing to a (typically) removable, non-volatile optical disk 1424 such as a CD, DVD, or other optical media. Hard disk drive 1416, magnetic disk drive 1418, and optical disk drive 1422 are each connected to system bus 1408 by one or more storage media interfaces 1426. Alternatively, hard disk drive 1416, magnetic disk drive 1418, and optical disk drive 1422 may be connected to system bus 1408 by one or more other separate or combined interfaces (not shown).

The disk drives and their associated processor-accessible media provide non-volatile storage of processor-executable instructions, such as data structures, program modules, and other data for computer 1402. Although example computer 1402 illustrates a hard disk 1416, a removable magnetic disk 1420, and a removable optical disk 1424, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hardwired IC chips. In other words, any processor-accessible media may be utilized to realize the storage media of the example operating environment 1400.

Any number of program modules (or other units or sets of processor-executable instructions) may be stored on hard disk 1416, magnetic disk 1420, optical disk 1424, ROM 1412, and/or RAM 1410, including by way of general example, an operating system 1428, one or more application programs 1430, other program modules 1432, and program data 1434. These program modules may include one or more of a skin-color model builder 302 (e.g., of FIG. 4), a face detector 304, an exposure level corrector 306, a contrast enhancer 308, input video 204, output video 206, and so forth.

A user may enter commands and/or information into computer 1402 via input devices such as a keyboard 1436 and a pointing device 1438 (e.g., a "mouse"). Other input devices 1440 (not shown specifically) may include a microphone, joystick, game pad, satellite dish, serial port, video camera, scanner, and/or the like. These and other input devices are connected to processing unit 1404 via input/output interfaces 1442 that are coupled to system bus 1408. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1444 or other type of display device may also be connected to system bus 1408 via an interface, such as a video adapter 1446. Video adapter 1446 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1444, other output peripheral devices may include components such as speakers (not shown) and a printer 1448, which may be connected to computer 1402 via input/output interfaces 1442.

Computer 1402 may operate in a networked environment using logical connections to one or more remote computers, such as a remote computing device 1450. By way of example, remote computing device 1450 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1450 is illustrated as a portable computer that may include many or all of the elements and features described herein with respect to computer 1402.

Logical connections between computer 1402 and remote computer 1450 are depicted as a local area network (LAN) 1452 and a general wide area network (WAN) 1454. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 1402 is usually connected to LAN 1452 via a network interface or adapter 1456. When implemented in a WAN networking environment, computer 1402 typically includes a modem 1458 or other component for establishing communications over WAN 1454. Modem 1458, which may be internal or external to computer 1402, may be connected to system bus 1408 via input/output interfaces 1442 or any other appropriate mechanism(s). It is to be appreciated that the illustrated network connections are examples and that other manners for establishing communication link(s) between computers 1402 and 1450 may be employed.

In a networked environment, such as that illustrated with operating environment 1400, program modules or other instructions that are depicted relative to computer 1402, or portions thereof, may be fully or partially stored in a remote media storage device. By way of example, remote application programs 1460 reside on a memory component of remote computer 1450 but may be usable or otherwise accessible via computer 1402. Also, for purposes of illustration, application programs 1430 and other processor-executable instructions such as operating system 1428 are illustrated herein as discrete blocks, but it is recognized that such programs, components, and other instructions reside at various times in different storage components of computing device 1402 (and/or remote computing device 1450) and are executed by processor(s) 1404 of computer 1402 (and/or those of remote computing device 1450).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible computer readable medium comprising processor-executable instructions that, when executed, direct a computing device to perform actions comprising:
   selecting, via the computing device, training pixels from an image frame based on a defined skin color range;
   building a skin-color model using the selected training pixels;
   detecting a skin portion of the image frame using the skin-color model; and
   adjusting the image frame with regard to the detected skin portion.

2. The one or more processor-accessible computer readable medium as recited in claim 1, wherein the action of adjusting comprises an action of:
   correcting an exposure level of the image frame responsive to an average luminance value of the detected skin portion.

3. The one or more processor-accessible computer readable medium as recited in claim 1, wherein the action of adjusting comprises an action of:
   enhancing a contrast amount of the image frame using an exposure-density function.

4. The one or more processor-accessible computer readable medium as recited in claim 1, wherein the action of building comprises an action of:
   building a two-dimensional Gaussian skin-color model.

5. The one or more processor-accessible computer readable medium as recited in claim 1, wherein the action of selecting comprises an action of:
   selecting the training pixels based on the defined skin color range; (i) the defined skin color range comprising at least one range of Gaussian distribution centers, and (ii) the defined skin color range created offline using a collection of test sequences, respective sets of skin pixels manually selected from respective ones of the collected test sequences, and respective Gaussian distribution centers calculated from respective Gaussian skin-color models built responsive to the respective sets of manually-selected skin pixels of the respective ones of the collected test sequences.

6. The one or more processor-accessible computer readable medium as recited in claim 1, wherein the action of selecting comprises an action of:
  selecting the training pixels based on the defined skin color range in a YCbCr color space, the defined skin color range including a range corresponding to Cb and a range corresponding to Cr.

7. The one or more processor-accessible computer readable medium as recited in claim 1, wherein the processor-executable instructions, when executed, direct the computing device to perform further actions comprising:
  determining a center of the skin-color model; and
  ascertaining if the determined center comports with at least one reliability range;
  wherein if the determined center is ascertained to comport with the at least one reliability range, the action of detecting comprises using a current skin-color model built for a current image frame to detect the skin portion of the current image frame.

8. The one or more processor-accessible computer readable medium as recited in claim 1, wherein the processor-executable instructions, when executed, direct the computing device to perform further actions comprising:
  determining a center of the skin-color model; and
  ascertaining if the determined center comports with at least one reliability range;
  wherein if the determined center is not ascertained to comport with the at least one reliability range, the action of detecting comprises using a previous skin-color model built for a previous image frame to detect the skin portion of a current image frame.

9. The one or more processor-accessible computer readable medium as recited in claim 1, wherein the processor-executable instructions, when executed, direct the computing device to perform further actions comprising:
  determining a center of the skin-color model; and
  ascertaining if the determined center comports with at least one reliability range;
  wherein the at least one reliability range comprises a summed reliability range and a difference reliability range that are produced offline from tracked centers of multiple respective Gaussian skin-color models of multiple respective test sequences.

10. The one or more processor-accessible computer readable medium as recited in claim 1, wherein the one or more processor-accessible media comprise at least one of (i) one or more storage media or (ii) one or more transmission media.

11. A device, comprising:
  one or more processors; and
  memory having instructions executable by the one or more processors, the memory including:
    a data collection module to accept a defined skin color range and an image frame as an input;
    a selection module to select training pixels from the image frame based on the defined skin color range; and
    a skin-color model builder module to build a skin-color model at runtime for the image frame using the selected training pixels.

12. The device as recited in claim 11, wherein the device is at least one of (i) a mobile telephone, (ii) video conferencing equipment, or (iii) at least part of a personal computer.

13. The device as recited in claim 11, wherein the defined skin color range is expressed in terms of chrominance-B and chrominance-R in a YCbCr color space.

14. The device as recited in claim 11, wherein the skin-color model builder module is further operable to scan the image frame for pixels having chrominance values fitting within the defined skin color range and to select those pixels as the training pixels.

15. The device as recited in claim 11, wherein the skin-color model builder is further operable to:
  accept at least one reliability range as an input; and
  perform a reliability examination on the skin-color model built for the image frame using the at least one reliability range.

16. The device as recited in claim 15, wherein the skin-color model built by the skin-color model builder module includes a Gaussian skin-color model; and wherein the at least one reliability range includes a summed reliability range and a difference reliability range that are determined from multiple tracked centers of multiple Gaussian skin-color models from multiple test sequences, and wherein the reliability examination comprises ascertaining if a center of the built Gaussian skin-color model comports with the summed reliability range and the difference reliability range.

17. The device as recited in claim 16, further comprising:
  a face detector that is adapted to detect at least part of a face of the image frame utilizing a given Gaussian skin-color model;
  wherein the Gaussian skin-color model built by the skin-color model builder for the image frame is utilized by the face detector to detect the at least part of the face when the built Gaussian skin-color model is ascertained to comport with the summed reliability range and the difference reliability range, and another Gaussian skin-color model built for a previous image frame is utilized by the face detector to detect the at least part of the face when the built Gaussian skin-color model is ascertained to not comport with the summed reliability range and the difference reliability range.

18. The device as recited in claim 11, further comprising:
  a face detector that is a capable of accepting the skin-color model from the skin-color model builder, the face detector adapted to scan pixels of the image frame and to use the skin-color model to add a particular pixel to a set of face pixels if a probability that the particular pixel belongs to a skin color class exceeds a predetermined skin pixel probability threshold.

19. The device as recited in claim 11, further comprising:
  an exposure level corrector that is adapted (i) to calculate a difference between an ideal exposure level and an average luminance value for a set of face pixels that are detected in the image frame using the skin-color model and (ii) to re-expose each pixel from the image frame responsive to the calculated difference.

20. The device as recited in claim 11, further comprising:
  a contrast enhancer that is adapted to convert each pixel from the image frame to a corresponding light intensity using a first contrast amount control variable value and to reconvert the corresponding light intensity back to a pixel value using a second contrast amount control variable value, 21. The device as recited in claim 11, further comprising:
an exposure level corrector and contrast enhancer that is adapted to re-expose each pixel from the image frame utilizing an exposure-density function (i) responsive to a difference between an ideal exposure level and an average luminance value of a set of skin pixels of the image frame and (ii) using a ratio of contrast amount control variables.

22. An arrangement for video image processing in conjunction with skin color modeling, the arrangement comprising:
selection means for selecting training pixels from an image frame using a predefined skin color range;
build means for building a skin-color model using the selected training pixels; and
detection means for detecting a skin portion of the image frame using the skin-color model.

23. The arrangement as recited in claim 22, further comprising:
means for conducting a reliability examination to ascertain if at least one attribute of the skin-color model comports with a reliability range; and
utilization means for utilizing the skin-color model built for the image frame when detecting a skin portion in the image frame if the at least one attribute is ascertained to comport with the reliability range and for utilizing another skin-color model built for a previous image frame when detecting a skin portion in the image frame if the at least one attribute is not ascertained to comport with the reliability range.

24. The arrangement as recited in claim 22, wherein the detection means for detecting a skin portion of the image frame further includes using a skin pixel probability threshold.

25. The arrangement as recited in claim 22, further comprising:
correction means for correcting an exposure level of the image frame responsive to an ideal exposure level and an average luminance value of a set of skin pixels detected using the skin-color model.

26. The arrangement as recited in claim 22, further comprising:
enhancement means for enhancing a contrast amount of the image frame by re-exposing pixels of the image frame using a ratio of contrast amount control variables.

27. The arrangement as recited in claim 22, further comprising:
combination means for correcting an exposure level and enhancing a contrast amount of the image frame using an exposure-density function along with (i) a difference between an ideal exposure level and an average luminance value of a skin portion detected using the skin-color model and (ii) a ratio of contrast amount control variables.

28. The arrangement as recited in claim 22, wherein the arrangement comprises at least one of (i) one or more processor-accessible media or (ii) at least one device.

29. A method, comprising:
building a skin-color model, via a computing device, for an image frame using a defined skin color range;
detecting a facial portion in the image frame using the skin-color model; and
correcting an exposure level of the image frame based on a luminance value of the detected facial portion.

30. The method as recited in claim 29, wherein the building the skin-color model includes building the skin-color model at runtime for multiple frames.

31. The method as recited in claim 30, wherein the building a skin-color model includes building the skin-color model for one image frame out of every predetermined number of image frames.

32. The method as recited in claim 30, wherein the skin-color model comprises a Gaussian skin-color model; and wherein the defined skin color range is created offline using a collection of test sequences; respective sets of skin pixels manually selected from respective ones of the collected test sequences, and respective Gaussian distribution centers calculated from respective Gaussian skin-color models built responsive to the respective sets of manually-selected skin pixels of the respective ones of the collected test sequences; the defined skin color range created based on the calculated respective Gaussian distribution centers.

33. The method as recited in claim 29, further comprising enhancing a contrast amount of the image frame.

34. The method as recited in claim 29, wherein the luminance value comprises an average luminance value; and
further comprising skipping the action of correcting when the average luminance value of the detected facial portion is relatively close to an ideal exposure level.

35. The method as recited in claim 29, wherein the detecting a facial portion in the image frame includes determining if respective individual probabilities associated with respective individual pixels of multiple pixels of the image frame exceed a predetermined threshold, each respective individual probability indicating if an associated respective individual pixel is likely to belong to a skin color class in accordance with the skin-color model.

36. The method as recited in claim 29, wherein the building a skin-color model includes:
selecting training pixels from the image frame based on the defined skin color range; and
building the skin-color model using the selected training pixels.

37. The method as recited in claim 29, wherein the skin-color model comprises a Gaussian skin-color model;
wherein the building a skin-color model includes:
selecting training pixels from the image frame based on the defined skin color range; and
building the Gaussian skin-color model using the selected training pixels; and
the method further comprising:
determining a center of the Gaussian skin-color model;
ascertaining if the determined center corn ports with at least one reliability range;
if the determined center is ascertained to comport with the at least one reliability range, utilizing the Gaussian skin-color model built for the image frame in the action of detecting; and
if the determined center is not ascertained to comport with the at least one reliability range, utilizing a previous Gaussian skin-color model built for a previous image frame in the action of detecting.

38. The method as recited in claim 37, wherein the at least one reliability range comprises a summed reliability range and a difference reliability range, the summed and difference reliability ranges produced from multiple tracked Gaussian centers of multiple Gaussian skin-color models built offline from multiple test sequences.

39. A runtime method comprising:
using a selecting module for selecting training pixels from an image frame based on a predefined skin color range, the predefined skin color range created offline;

using a skin color model builder module for building a Gaussian skin-color model using the selected training pixels;
using a detecting module for detecting a facial portion of the image frame using the Gaussian skin-color model and a skin pixel probability threshold; and
using a correcting module for correcting an exposure level of the image frame with regard to the detected facial portion.

* * * * *